US010295386B2

(12) United States Patent
Dooley et al.

(10) Patent No.: US 10,295,386 B2
(45) Date of Patent: May 21, 2019

(54) ELECTROMAGNETIC FLOW METER

(75) Inventors: Vince Dooley, Western Australia (AU); Yoshihiko Okayama, Tokyo (JP); Shinsuke Matsunaga, Tokyo (JP); Ichiro Mitsutake, Tokyo (JP)

(73) Assignee: Azbil Corporation, Tokyo (JP)

( * ) Notice: Subject to any disclaimer, the term of this patent is extended or adjusted under 35 U.S.C. 154(b) by 1592 days.

(21) Appl. No.: 13/988,238

(22) PCT Filed: Nov. 19, 2010

(86) PCT No.: PCT/IB2010/002961
§ 371 (c)(1),
(2), (4) Date: May 17, 2013

(87) PCT Pub. No.: WO2012/066372
PCT Pub. Date: May 24, 2012

(65) Prior Publication Data

US 2013/0238259 A1 Sep. 12, 2013

(51) Int. Cl.
*G01F 1/00* (2006.01)
*G01F 1/60* (2006.01)
*G01F 25/00* (2006.01)

(52) U.S. Cl.
CPC ............ *G01F 1/60* (2013.01); *G01F 25/0007* (2013.01)

(58) Field of Classification Search
CPC ........................................................ G01F 1/60
See application file for complete search history.

(56) References Cited

U.S. PATENT DOCUMENTS 3,580,092 A * 5/1971 Scarpa .................... G01F 1/666 310/322
3,707,675 A * 12/1972 Krechmery ............... G01F 1/60 324/140 D (Continued)

FOREIGN PATENT DOCUMENTS

EP 1970675 A2 9/2008
JP 59-094014 A 5/1984

(Continued)

OTHER PUBLICATIONS

International Preliminary Report on Patentability, dated May 30, 2013, which issued during the prosecution of International Patent Application No. PCT/IB2010/002961, which corresponds to the present application.

(Continued)

*Primary Examiner* — Hyun D Park
(74) *Attorney, Agent, or Firm* — Oblon, McClelland, Maier & Neustadt, L.L.P.

(57) ABSTRACT

An electromagnetic flow meter includes a measurement tube, an excitation coil, an excitation current supplying unit supplying an excitation current with an excitation frequency fex to the excitation coil, a pair of electrodes disposed inside the measurement tube, a measuring unit measuring a flow based on an emf that arises between the electrodes, a first A/D converting unit that converts the emf to a digital signal, a sampling unit sampling the digital signal, a noise evaluation value calculating unit, based on at least the sample data sampled by the sampling unit, calculating as a noise evaluation value the magnitude of the impact of a noise component owing to adherence of foreign matter to the electrodes upon the measurement of the flow, and an electrode scaling diagnosing unit determining an electrode foreign matter (Continued)

adherence state by comparing the noise evaluation value and a predetermined diagnostic threshold value.

12 Claims, 19 Drawing Sheets

(56) References Cited

U.S. PATENT DOCUMENTS

| | | | | |
|---|---|---|---|---|
| 4,934,194 | A * | 6/1990 | Itoh ......................... | G01F 1/329 73/861.22 |
| 5,629,481 | A * | 5/1997 | Sultan ................... | G01F 1/6888 73/204.16 |
| 6,615,149 | B1 | 9/2003 | Wehrs | |
| 2001/0045134 | A1 * | 11/2001 | Henry ....................... | G01F 1/74 73/861.356 |
| 2008/0078252 | A1 | 4/2008 | Graber et al. | |
| 2008/0250867 | A1 | 10/2008 | Schmalzried et al. | |
| 2008/0282766 | A1 | 11/2008 | Ishikawa et al. | |

FOREIGN PATENT DOCUMENTS

| | | | |
|---|---|---|---|
| JP | 2002-168666 | A | 6/2002 |
| JP | 2003-028684 | A | 1/2003 |
| JP | 2004-077365 | A | 3/2004 |
| JP | 2004-528527 | A | 9/2004 |
| JP | 2005-069798 | A | 3/2005 |
| JP | 2010-521659 | A | 6/2010 |
| WO | 01/90702 | A2 | 11/2001 |
| WO | 2008/042290 | A2 | 4/2008 |

OTHER PUBLICATIONS

Australian Examination Report, dated Jan. 7, 2014, which issued during the prosecution of Australian Patent Application No. 2010364174, which corresponds to the present application.

International Search Report, dated Aug. 16, 2011, which issued during the prosecution of International Patent Application No. PCT/IB2010/002961, which corresponds to the present application.

* cited by examiner

FIG. 12

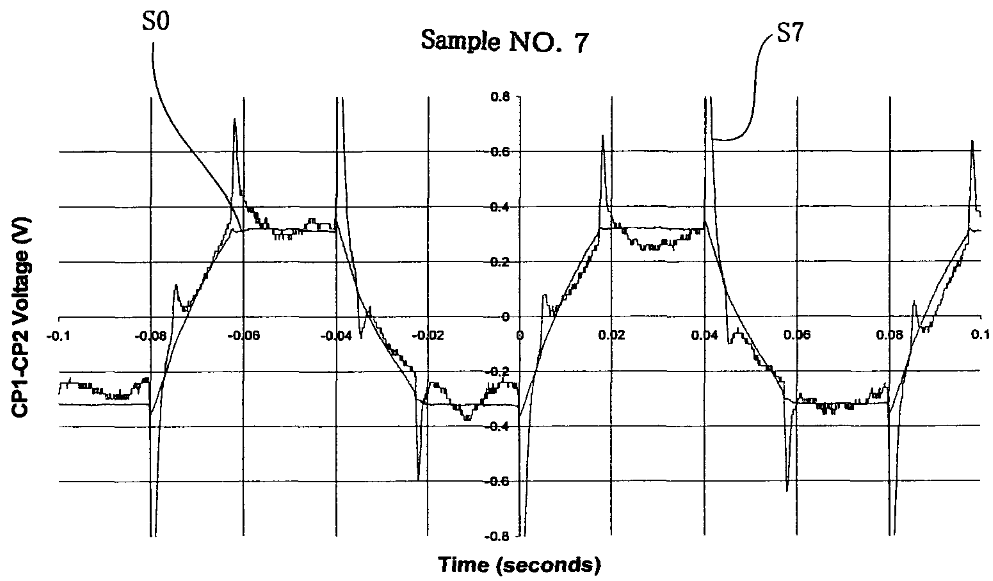

FIG. 13

| Sample No. | Explanation | Error (%) | NF (Volts) | SCALE ERROR |
|---|---|---|---|---|
| 1 | Used meter. Heavily scaled throughout. | 13.4 | 0.0045 | Present |
| 2 | Extremely heavy scale throughout | 44.78 | 0.0598 | Present |
| 3 | Partly scaled. Thin hard scale on 'B' electrode. 'A' electrode clean. | 52.37 | 0.0105 | Present |
| 4 | 'A' electrode scaled. 'B' electrode partially scaled. | 0.28 | 0.0014 | Absent |
| 5 | Midium to heavy scale on both electrodes. | 7.42 | 0.0151 | Present |
| 6 | Heavy scaling throughout. Both electrodes fully covered. | 21.63 | 0.0539 | Present |
| 7 | Midium scale through out. Both electrodes covered. | 15.02 | 0.0121 | Present |

FIG. 18

| Sample No. | Explanation | Error [%] | HR [%] | SCALE ERROR |
|---|---|---|---|---|
| 1 | Used meter. Heavily scaled throughout. | 13.4 | 16 | Present |
| 2 | Extremely heavy scale throughout | 44.78 | 67 | Present |
| 3 | Partly scaled. Thin hard scale on 'B' electrode. 'A' electrode clean. | 52.37 | 20 | Present |
| 4 | 'A' electrode scaled. 'B' electrode partially scaled. | 0.28 | 3 | Absent |
| 5 | Midium to heavy scale on both electrodes. | 7.42 | 13 | Present |
| 6 | Heavy scaling throughout. Both electrodes fully covered. | 21.63 | 56 | Present |
| 7 | Midium scale through out. Both electrodes covered. | 15.02 | 20 | Present |

FIG. 19

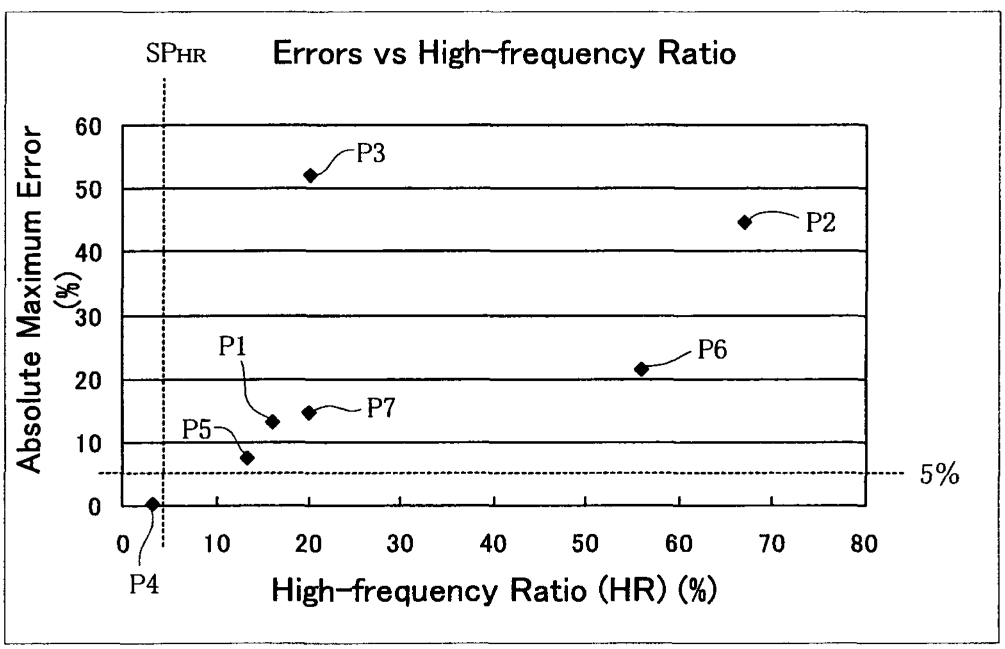

FIG. 20

CASE OF SYNCHRONOUS 50 Hz AC

| | Excitation Frequency fex[Hz] | Excitation Period [ms] | Sample Size | Cutoff Frequency fc[Hz] |
|---|---|---|---|---|
| Setting1 | 3.12 | 320 | 12800 | 25 |
| Setting2 | 6.25 | 160 | 6400 | 50 |
| Setting3 | 12.5 | 80 | 3200 | 100 |
| Setting4 | 25 | 40 | 1600 | 200 |

FIG. 21

CASE OF SYNCHRONOUS 60Hz AC

| | Excitation Frequency fex[Hz] | Excitation Period [ms] | Sample Size | Cutoff Frequency fc[Hz] |
|---|---|---|---|---|
| Setting1 | 3.75 | 267 | 10668 | 30 |
| Setting2 | 7.5 | 133 | 5332 | 60 |
| Setting3 | 15 | 67 | 2668 | 120 |
| Setting4 | 30 | 33 | 1332 | 240 |

FIG. 22

CASE OF ASYNCHRONOUS AC

| | Excitation Frequecy fex[Hz] | Excitation Period [ms] | Sample Size | Cutoff Frequency fc[Hz] |
|---|---|---|---|---|
| Setting1 | 3.12 | 320 | 12800 | 25 |
| Setting2 | 3.75 | 267 | 10668 | 30 |
| Setting3 | 5 | 200 | 8000 | 40 |
| Setting4 | 6.25 | 160 | 6400 | 50 |
| Setting5 | 7.5 | 133 | 5332 | 60 |
| Setting6 | 12.5 | 80 | 3200 | 100 |
| Setting7 | 15 | 67 | 2668 | 120 |
| Setting8 | 17.5 | 57 | 2284 | 140 |
| Setting9 | 22.5 | 44 | 1776 | 180 |
| Setting10 | 25 | 40 | 1600 | 200 |
| Setting11 | 27.5 | 36 | 1456 | 220 |
| Setting12 | 30 | 33 | 1332 | 240 |
| Setting13 | 75 | 13 | 532 | 600 |
| Setting14 | 85 | 12 | 472 | 680 |
| Setting15 | 115 | 9 | 348 | 920 |
| Setting16 | 135 | 7 | 296 | 1080 |

ELECTROMAGNETIC FLOW METER

CROSS-REFERENCE TO RELATED APPLICATION

This is a U.S. national phase application under 35 U.S.C. § 371 of International Patent Application No. PCT/IB2010/002961, filed on Nov. 19, 2010. The International Application was published on May 24, 2012, as International Publication No. WO 2012/066372 A1 under PCT Article 21(2). The entire contents of this application are hereby incorporated herein by reference.

FIELD OF THE INVENTION

The present invention relates to an electromagnetic flow meter that measures the flow of an electrically conductive fluid.

BACKGROUND OF THE INVENTION

In the conventional art, this type of electromagnetic flow meter is configured such that an electric current whose polarity alternates with a prescribed frequency is supplied, as an excitation current, to an excitation coil, which is disposed such that the direction in which its magnetic field is generated is perpendicular to the direction in which the fluid flows inside a measurement tube. A frequency fex of the excitation current is called an excitation frequency.

Furthermore, supplying the excitation current at the excitation frequency fex to the excitation coil generates an emf (i.e., a signal emf) between a pair of electrodes that is disposed inside the measurement tube, the emf being orthogonal to the magnetic field generated by the excitation coil; furthermore, the measured flow can be obtained by detecting this signal emf as an analog flow signal and converting this detected analog flow signal to a digital signal.

In this electromagnetic flow meter, if foreign matter adheres to the electrodes, then a noise component owing to the adherence of this foreign matter will affect the signal emf, and it will no longer be possible to accurately measure the flow of the fluid (e.g., refer to Patent Document 1). Namely, the signal emf that arises between the electrodes will contain both the flow signal component and the noise component, the ratio of the noise component contained in the signal emf will increase, and it will no longer be possible to accurately measure the flow of the fluid.

Accordingly, if a function that automatically detects whether foreign matter is adhered to the electrodes (i.e., an electrode scaling detection function) is added to the electromagnetic flow meter, then removing the foreign matter can be performed in a timely manner, thereby improving the utility of the electromagnetic flow meter. Examples of electromagnetic flow meters that have such an electrode scaling detection function are disclosed in Patent Documents 2, 3.

In the electromagnetic flow meter described in Patent Document 2, the resistance of each electrode is measured, and if the resistance of a measured electrode exceeds a prescribed value (i.e., if an increase in the electrode resistance is detected), then it is judged that foreign matter is adhered to that electrode.

Two types of electromagnetic flow meters are described in Patent Document 3. In a first type of electromagnetic flow meter described in Patent Document 3, a ternary excitation system is adopted wherein excitation owing to excitation current in the positive direction is positive excitation, excitation wherein the excitation current is zero is nonexcitation, and excitation owing to excitation current in the negative direction is negative excitation; furthermore, based on the magnitude of signal emfs ($V_{11}-V_{15}$: signal emfs in the state wherein foreign matter is not adhered; $V_{21}-V_{25}$: signal emfs in the state wherein foreign matter is adhered) obtained at intervals K1–K5 (K1, K3, K5: nonexcitation; K2: positive excitation; and K4: negative excitation), calculation results $R_1-R_4$ (i.e., $R_1=-V_{21}+V_{22}+V_{23}-V_{24}$, $R_2=(-V_{21}+2V_{22}-2V_{24}+V_{25})/2$, $R_3=-V_{11}+V_{12}+V_{13}-V_{14}$, $R_4=(-V_{11}+2V_{12}-2V_{14}+V_{15})/2$) are calculated and, based on these calculation results $R_1-R_4$, a foreign matter adherence impact component is derived.

In the second type of electromagnetic flow meter described in Patent Document 3, a binary excitation system with two excitation frequencies (i.e., a working excitation frequency fH and a low excitation frequency fL) is adopted; furthermore, in the state wherein foreign matter is not adhered, a differential noise component is derived by subtracting the averaged process value of the signal emfs at the low excitation frequency fL from the averaged process value of the signal emfs during an interval at the working excitation frequency fH, and this derived differential noise component is stored in memory as a RAM variable A. Furthermore, in the state wherein foreign matter is adhered, a foreign matter adherence impact component is derived by subtracting the averaged process value of the signal emfs at the low excitation frequency fL from the averaged process value of the signal emfs during an interval at the working excitation frequency fH, and then subtracting from this value the RAM variable A (i.e., the differential noise component) stored in memory.

PRIOR ART LITERATURE

Patent Literature

Patent Document 1

Published Japanese Translation No. 2010-521659 of the PCT International Publication Patent Document 2

Japanese Unexamined Patent Application Publication No. 2003-028684

Patent Document 3

Japanese Unexamined Patent Application Publication No. 2002-168666

Patent Document 4

Published Japanese Translation No. 2004-528527 of the PCT International Publication

OVERVIEW OF THE INVENTION

Problems Solved by the Invention

Nevertheless, in the electromagnetic flow meter described in Patent Document 2, a system is adopted wherein an increase in the electrode resistance is detected, and consequently there is a risk of misdiagnosis. Namely, the electrode resistance increases not only when foreign matter is adhered to the electrode but also when the resistance value in the measured fluid changes. Consequently, an increase in the electrode resistance cannot be regarded unmistakably as the adherence of foreign matter to the electrodes, and therefore there is a risk of misdiagnosis. In addition, in the electromagnetic flow meter described in Patent Document 2, the resistance of the electrodes is measured, which necessitates a special configuration, such as an electrode leader line.

In addition, in contrast to the usual binary excitation system wherein one excitation frequency is employed, in the electromagnetic flow meter described in Patent Document 3, a ternary excitation system is adopted and therefore a binary excitation system with two excitation frequencies must be configured; consequently, the circuit configuration and the processing to implement this special excitation system becomes complicated.

Furthermore, Patent Document 4 describes an electromagnetic flow meter wherein an analog signal that contains a flow signal component and a noise component from electrodes is converted to a digital signal, this digital signal is processed, a spectral component is generated, a flow signal component and a known noise component are isolated and extracted from this spectral component, and a noise diagnostic output is generated based on this extracted known noise component.

Nevertheless, in the electromagnetic flow meter described in Patent Document 4, the noise that is the object of the noise diagnostic output is, for example, noise that coincides with a service power supply frequency or a known noise, which is called 1/F noise, with a frequency lower than that of the excitation frequency. In the electromagnetic flow meter described in Patent Document 4, as will be understood from the text of the working examples of the present invention discussed below, the noise of the frequency components that arises owing to the adherence of foreign matter to the electrodes is not extracted, and therefore it is not possible to detect whether foreign matter is adhered to the electrodes.

The present invention was conceived in order to solve such problems, and an object of the present invention is to provide an electromagnetic flow meter that is capable of accurately detecting, with a simple configuration, a state wherein foreign matter is adhered to electrodes.

Means of Solving the Problems

To achieve the abovementioned objects, an electromagnetic flow meter according to one aspect of the present invention comprises: a measurement tube, wherethrough a fluid flows; an excitation coil; an excitation current supplying means, which supplies an excitation current with an excitation frequency fex to the excitation coil; a pair of electrodes, which is disposed inside the measurement tube; a means of measuring a flow based on an emf that arises between the electrodes; a first A/D converting means, which converts the emf to a digital signal; a sampling means, which samples the digital signal with a prescribed period; a noise evaluation value calculating means, which, based on at least the sample data sampled by the sampling means, calculates as a noise evaluation value the magnitude of the impact of a noise component owing to adherence of foreign matter to the electrodes upon the measurement of the flow; and an electrode scaling diagnosing means, which determines an electrode foreign matter adherence state by comparing the noise evaluation value and a predetermined diagnostic threshold value.

According to this aspect of the invention, the emf that arises between the electrodes is converted to the digital signal, and the flow signal, which was converted to this digital signal and contains the noise component, is sampled at the prescribed period. Furthermore, based on this sampled digital signal, an evaluation value, which indicates the magnitude of the impact of the noise component owing to the adherence of foreign matter to the electrodes upon the measurement of the flow, is calculated as the noise evaluation value, this calculated noise evaluation value is compared with the diagnostic threshold value, and, based on the result of this comparison, the state of adherence of foreign matter to the electrodes is determined.

For example, one aspect of the present invention comprises: a sample data group storing means, which stores each piece of the sample data sampled in a fixed interval together with a sample timing; and a normal data group storing means, which stores each piece of the sample data sampled in the fixed interval when the foreign matter is not adhered to the electrodes together with the sample timing. Furthermore, the noise evaluation value calculating means, which reads out from the sample data group storing means and the normal data group storing means, the sample data corresponding to the sample timing and the normal data, respectively, and calculates as the noise factor NF the average value of the absolute values of the differences between the sample data and the normal data; and the electrode scaling diagnosing means compares the calculated noise factor NF and the diagnostic threshold value $SP_{NF}$ and, when the noise factor NF exceeds the diagnostic threshold value $SP_{NF}$, determines that foreign matter is adhered to the electrodes.

For example, another aspect of the present invention comprises: a first integrating means, which calculates as a first integrated value a value calculated by integrating the absolute values of all frequency components of the sample data sampled by the sampling means for a prescribed interval; an extracting means, which extracts frequency components—of the frequency components of the sample data sampled by the sampling means for the prescribed interval—that are greater than or equal to a prescribed frequency, which is higher than the excitation frequency fex; and a second integrating means, which calculates as a second integrated value a value calculated by integrating the absolute values of the extracted frequency components that are greater than or equal to the prescribed frequency; wherein, the noise evaluation value calculating means calculates as a high frequency ratio HR the ratio of the second integrated value, which is calculated by the second integrating means, to the first integrated value, which is calculated by the first integrating means. Furthermore, the electrode scaling diagnosing means compares the calculated high frequency ratio HR and the diagnostic threshold value $SP_{HR}$ and, when the high frequency ratio HR exceeds the diagnostic threshold value $SP_{HR}$, determines that foreign matter is adhered to the electrodes.

Effects of the Invention

According to the present invention, it is possible to accurately detect, with a simple configuration, whether foreign matter is adhered to electrodes.

BRIEF DESCRIPTION OF THE DRAWINGS

FIG. 12 shows the observed waveform of an analog flow signal (i.e., a flow signal component and noise component) in an electromagnetic flow meter (i.e., a meter of a sample No. 7) in a unique state of adherence of foreign matter to the electrodes.

FIG. 13 shows the relationship between a noise factor NF (volts), which is calculated in each of the meters Nos. 1-7, and a flow measurement error Error (%).

FIG. 18 shows the relationship between a high frequency ratio HR (%), which is calculated in each of the meters of the samples No. 1-No. 7, and the flow measurement error Error (%).

FIG. 19 is a graph that plots the relationship between the high frequency ratio HR and the flow measurement error Error, wherein the high frequency ratio HR is the abscissa and the flow measurement error Error is the ordinate.

FIG. 20 shows embodiments of an excitation frequency fex, an excitation period, a sample size, and a cutoff frequency fc for the case wherein the excitation frequency fex is synchronized with a service power supply frequency of 50 Hz AC.

FIG. 21 shows embodiments of the excitation frequency fex, the excitation period, the sample size, and the cutoff frequency fc for the case wherein the excitation frequency fex is synchronized with a service power supply frequency of 60 Hz AC.

FIG. 22 shows embodiments of the excitation frequency fex, the excitation period, the sample size, and the cutoff frequency fc for the case of asynchronous AC.

DETAILED DESCRIPTION OF THE PREFERRED EMBODIMENTS

The text below explains the present invention in detail, referencing the drawings.

Figure 1:
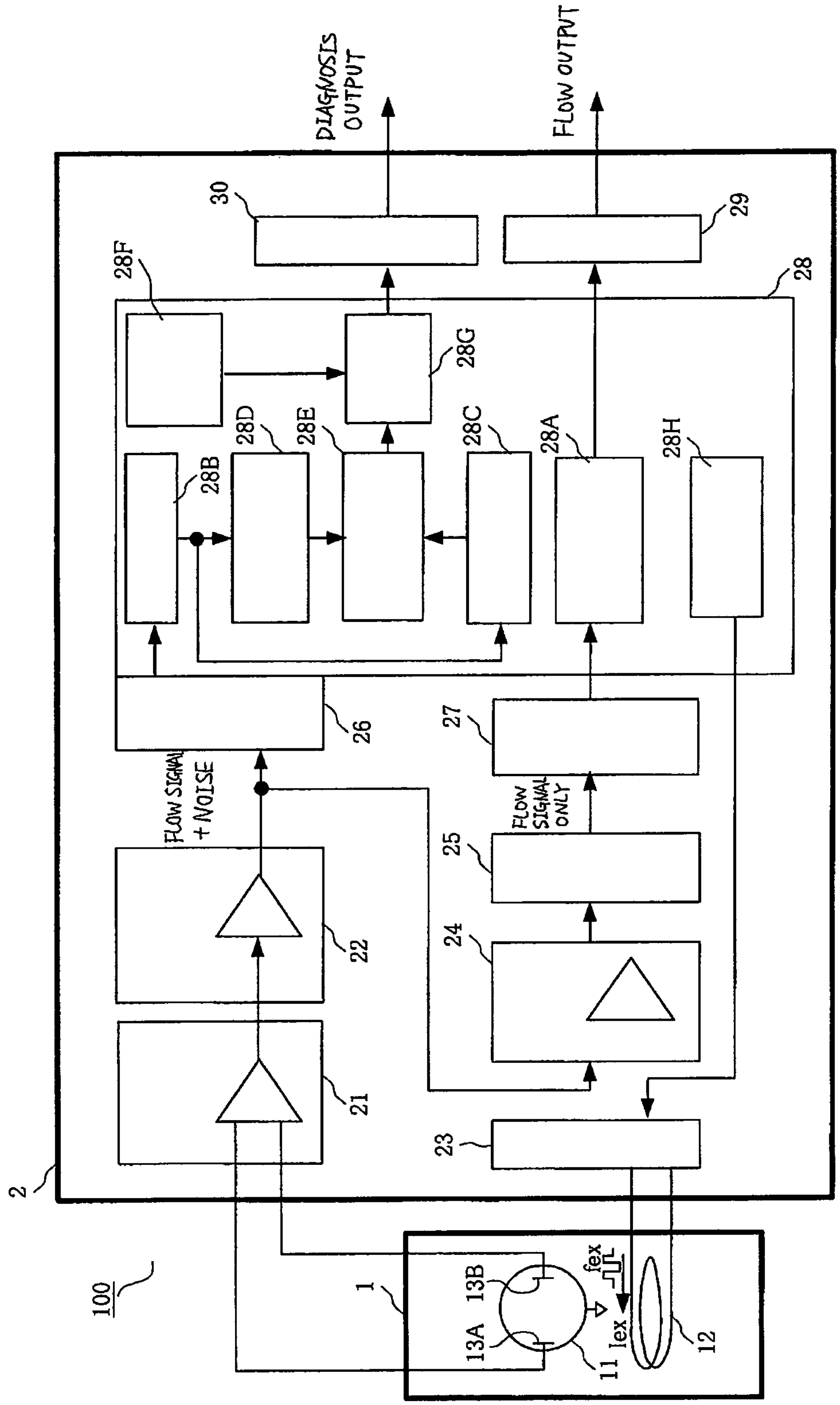
FIG. 1 shows the principal parts of a first working example (i.e., a working example 1) of an electromagnetic flow meter according to the present invention.

Working Example 1: Example Wherein Noise Factor NF is Used as a Noise Evaluation Value FIG. 1 shows the principal parts of a first working example (i.e., a working example 1) of an electromagnetic flow meter according to the present invention.

In this drawing, 1 is a detector that receives a supply of an excitation current Iex whose polarity alternates with a frequency fex, impresses a magnetic field on a fluid that flows inside a measurement tube 11, and outputs a signal emf generated by that fluid; furthermore, 2 is a converter that supplies the excitation current Iex to the detector 1, detects the signal emf from the detector 1 as an analog flow signal, converts the analog flow signal to a digital signal, and thereby calculates the flow of the fluid that flows inside the measurement tube 11. The detector 1 and the converter 2 constitute an electromagnetic flow meter 100 of the working example 1.

In the detector 1, 12 is an excitation coil, which is disposed such that the direction in which its magnetic field is generated is perpendicular to the direction in which the fluid flows inside the measurement tube 11, and 13A, 13B are two electrodes, which are disposed inside the measurement tube 11 orthogonal to the direction in which the fluid flows inside the measurement tube 11 and the direction in which the magnetic field of the excitation coil 12 is generated.

The excitation current Iex is supplied from the converter 2 to the excitation coil 12. Thereby, the magnetic field generated by the excitation coil 12 is exerted upon the fluid that flows inside the measurement tube 11, and a signal emf with an amplitude that corresponds to the flow speed of the fluid is generated between the electrodes 13A, 13B. The signal emf generated between the electrodes 13A, 13B is supplied to the converter 2.

The converter 2 comprises a first stage circuit 21, an AC amplifier circuit 22, an excitation unit 23, a DC amplifier circuit 24, a noise cancelling circuit 25, a first A/D conversion unit 26, a second A/D conversion unit 27, a control unit 28, a flow output unit 29, and a scaling diagnosis output unit 30.

In this working example, the control unit 28 is implemented by: hardware, which comprises a processor (i.e., a CPU), a storage apparatus, and the like; and a program, which cooperates with the hardware to implement various functions; furthermore, in addition to the usual flow calculating function, the control unit 28 has a function that is specific to the present embodiment, namely, an electrode scaling diagnosing function.

Furthermore, in this working example, an A/D converter that is built into the CPU in the control unit 28 is used as the first A/D conversion unit 26. In addition, an A/D converter whose analog-digital conversion accuracy is higher than that of the first A/D conversion unit 26 is used as the second A/D conversion unit 27.

In the converter 2, the signal emf from the detector 1 is supplied to the first stage circuit 21. The signal emf supplied to the first stage circuit 21 is amplified in the AC amplifier circuit 22 and then supplied to the first A/D conversion unit 26 and the DC amplifier circuit 24 as an analog flow signal. This analog flow signal contains a flow signal component and a noise component.

The first A/D conversion unit 26 converts the analog flow signal supplied from the AC amplifier circuit 22 to a digital signal and supplies such to the control unit 28. The DC amplifier circuit 24 converts the analog flow signal from the AC amplifier circuit 22 to a DC flow signal, amplifies such, and supplies it to the noise cancelling circuit 25. The noise cancelling circuit 25 cancels the noise component contained in the DC flow signal supplied from the DC amplifier circuit 24 and supplies only the flow signal component to the second A/D conversion unit 27. The second A/D conversion unit 27 converts the DC flow signal, the noise component of which has been canceled by the noise cancelling circuit 25, to a digital signal and supplies such to the control unit 28. The excitation unit 23 receives a command from the control unit 28, whereupon it outputs the excitation current Iex, whose polarity alternates with the excitation frequency fex.

The control unit 28 has a flow calculating function and an electrode scaling diagnosing function; the control unit 28 comprises a flow calculating unit 28A, which serves as a functional block for implementing the flow calculating function; furthermore, the control unit 28 comprises a sampling unit 28B, a normal data group storage unit 28C, a sample data group storage unit 28D, a noise evaluation value calculating unit 28E, a diagnostic threshold value storage unit 28F, and an electrode scaling diagnosing unit 28G, which serve as a functional block for implementing the electrode scaling diagnosing function. Furthermore, a symbol 28H is an excitation control unit, which instructs the excitation unit 23 to generate the excitation current Iex. In addition, a predetermined diagnostic threshold value $SP_{NF}$ is stored in the diagnostic threshold value storage unit 28F.

(Flow Calculating Function)

In the control unit 28, the flow calculating unit 28A calculates the present flow of the fluid flowing inside the measurement tube 11 based on the DC flow signal, which was converted to a digital signal by the second A/D conversion unit 27, and outputs the calculated flow via the flow output unit 29.

(Electrode Scaling Diagnosing Function)

In the control unit 28, the electrode scaling diagnosing function comprises a normal data group accumulation function, a sample data group accumulation function performed during electrode scaling diagnosis, a noise evaluation value calculating function that performs its calculation based on the normal data group and the sample data group, and a decision function that performs its diagnosis based on the calculated noise evaluation value.

(Accumulating the Normal Data Group)

In the normal state wherein foreign matter is not adhered to the electrodes 13A, 13B, namely, in an initial stage when the electromagnetic flow meter 100 is installed at the site, an operator instructs the control unit 28 to start accumulating the normal data group in the state wherein a prescribed flow of the fluid is flowing inside the measurement tube 11.

In so doing, the control unit 28 reads the value of the digital signal from the first A/D conversion unit 26 for a prescribed interval, which equals one period of the excitation frequency fex, at sample timings generated with a prescribed cycle, and accumulates the sample values of the read digital signal, together with the sample timings, in memory as normal data. In this case, the sampling of the normal data is performed by the sampling unit 28B and the sampled normal data is accumulated, together with the sampled timings, in the normal data group storage unit 28C.

Furthermore, in this example, the prescribed interval is one period of the excitation frequency fex, but it is not limited, thereto; for example, the prescribed interval may be two periods, three periods, or four periods of the excitation frequency fex. In addition, the prescribed interval may be determined arbitrarily with no relation to the excitation frequency fex and may also include a pause interval.

Figure 2:
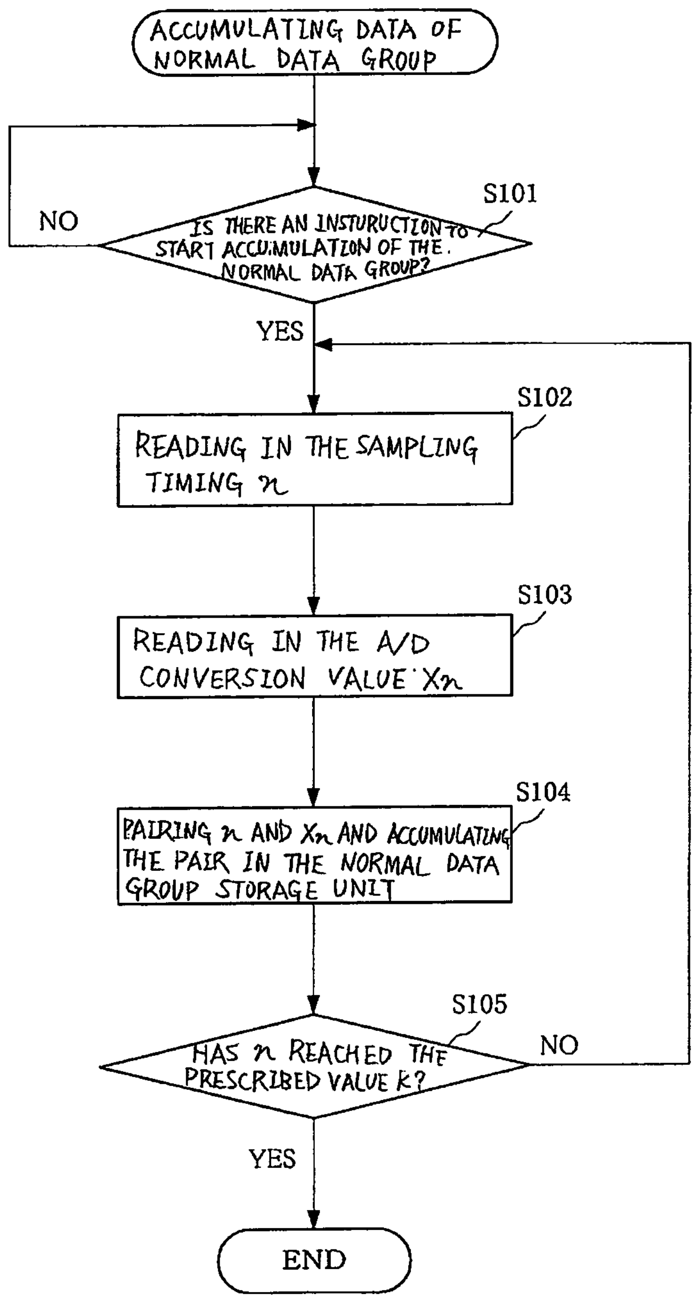
FIG. 2 is a flow chart of a normal data group accumulation operation that is performed by a control unit in the electromagnetic flow meter of the working example 1.

FIG. 2 is a flow chart of a normal data group accumulation operation. When the control unit 28 is instructed to start accumulating the normal data group (i.e., YES in a step S101), the control unit 28 reads a sample timing n (i.e., a step S102), reads a digital signal value $X_n$ (i.e., an A/D conversion value) from the first A/D conversion unit 26 at the sample timing n (i.e., a step S103), pairs the read-in digital signal value $X_n$, as the normal data, with the sample timing n, and accumulates such in the normal data group storage unit 28C (i.e., a step S104).

The control unit 28 repetitively performs the processing operation of the steps S102-S104 for one period of the excitation frequency fex, which serves as the prescribed interval, and when the sample size of the normal data reaches a prescribed value k, which indicates the end of the prescribed interval (i.e., YES in a step S105), the control unit 28 ends the accumulation of the normal data in the normal data group storage unit 28C.

Furthermore, in the present example, the normal data group is accumulated in the normal data group storage unit 28C using an actual machine, but the normal data group may be accumulated in advance in the normal data group storage unit 28C using a master machine at the ex-factory shipping stage. Namely, for each electromagnetic flow meter 100 manufactured, the same normal data group as that obtained by the master machine may be stored in the normal data group storage unit 28C prior to shipment of the electromagnetic flow meter 100.

(Accumulating the Sample Data Group During Electrode Scaling Diagnosis)

During the operation of installing the electromagnetic flow meter 100 on-site, the control unit 28 reads the value of the digital signal supplied from the first A/D conversion unit 26 for the prescribed interval of one period of the excitation frequency fex at the sample timings generated with the prescribed cycle—as in the collection interval of the normal data group—and accumulates the sample values of the read-in digital signal, which serve as the sample data, together with the sample timings in memory.

In this case, the sampling unit 28B performs the sampling of the normal data, and the sample data is accumulated, together with the sample timings, in the sample data group storage unit 28D. In addition, the accumulation of the sample data group in the sample data group storage unit 28D is repeated for each period of the excitation frequency fex. At this time, the accumulation of sample data in the sample data group storage unit 28D overwrites the previously accumulated data.

Figure 3:
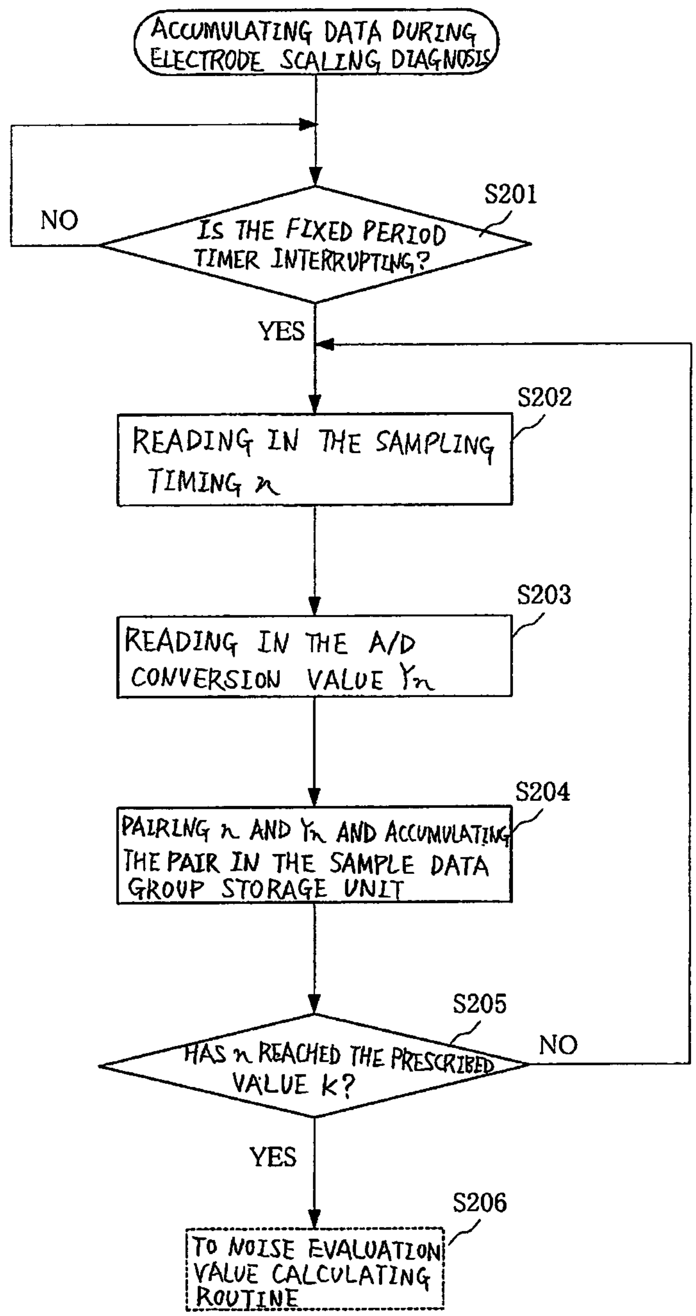
FIG. 3 is a flow chart of a sample data group accumulation operation that is performed by the control unit in the electromagnetic flow meter of the working example 1.

FIG. 3 is a flow chart of a sample data group accumulation operation. When the control unit 28 is notified by a fixed period interrupt timer of the start of one period of the excitation frequency fex (i.e., YES in a step S201), the control unit 28 reads in the sample timing n (i.e., a step S202), reads in a digital signal value $Y_n$ (i.e., an A/D conversion value) from the first A/D conversion unit 26 corresponding to the sample timing n (i.e., a step S203), pairs the read-in digital signal value $Y_n$, which serves as the sample data, with the sample timing n, and accumulates such in the sample data group storage unit 28D (i.e., a step S204).

The control unit 28 repeats the processing operations of the steps S202-S204 for one period of the excitation frequency fex, which serves as the prescribed interval, and when the sample size of the sample data reaches the prescribed value k, which indicates the end of the prescribed interval (i.e., YES in a step S205), the control unit 28 proceeds to a noise evaluation value calculating routine (i.e., a step S206).

(Calculating the Noise Evaluation Value (i.e., Noise Factor NF))

Figure 4:
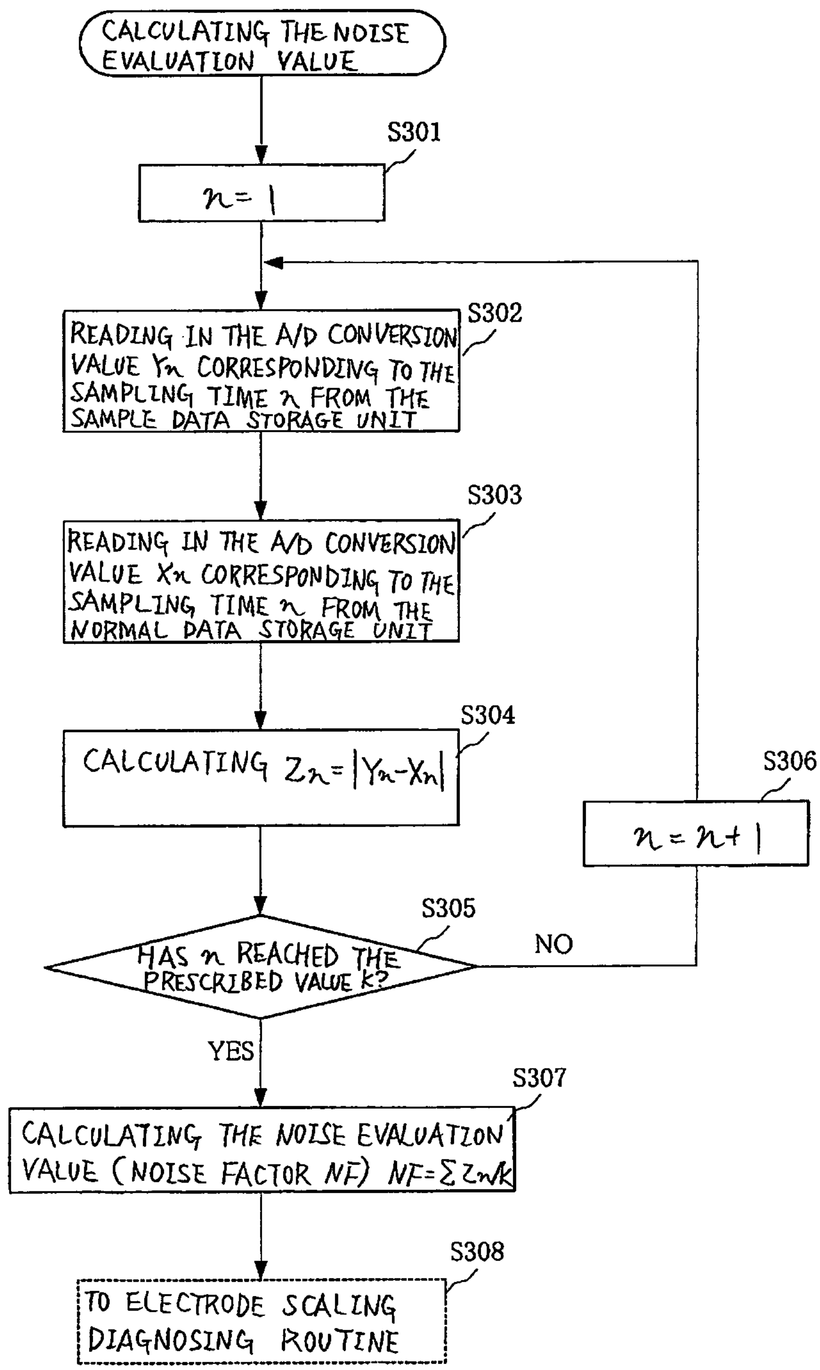
FIG. 4 is a flow chart of a noise evaluation value calculating routine that is performed by the control unit in the electromagnetic flow meter of the working example 1.

FIG. 4 is a flow chart of the noise evaluation value calculating routine. When the control unit 28 completes the accumulation of sample data in the sample data group storage unit 28D, the control unit 28 sets n=1 (i.e., a step S301), reads in the sample data $Y_n$, which corresponds to the sample timing n, from the sample data group storage unit 28D (i.e., a step S302), and reads in the normal data $X_n$, which corresponds to the sample timing n, from the normal data group storage unit 28C (i.e., a step S303). Furthermore, based on the read-in sample data $Y_n$ and the normal data $X_n$, an absolute value $Z_n$ of the difference between those data ($Z_n=|Y_n-X_n|$) is derived (i.e., a step S304).

The control unit 28 increments n by 1 (i.e., a step S306), repeats the processing operations of the steps S302-S304 and, when n reaches the prescribed value k, which indicates the final data in the sample data group storage unit 28D and the normal data group storage unit 28C (i.e., YES in a step S305), proceeds to a step S307.

In the step S307, the control unit 28 derives the average value of the absolute value $Z_n$ of the difference between the sample data $Y_n$ and the normal data $X_n$ derived in the step S304, namely, the average value of k absolute values $Z_n$, as the noise factor NF ($NF=\Sigma Z_n/k$) and sets this noise factor NF as the noise evaluation value, which is an evaluation of the impact of the noise component owing to the adherence of foreign matter to the electrodes 13A, 13B.

Furthermore, the control unit 28 proceeds to an electrode scaling diagnosing routine, which performs its diagnosis based on the calculated noise evaluation value (i.e., the noise factor NF) (i.e., a step S308). Furthermore, the calculation of the noise factor NF is performed by the noise evaluation value calculating unit 28E.

(Diagnosing Electrode Scaling Based on the Noise Evaluation Value)

Figure 5:
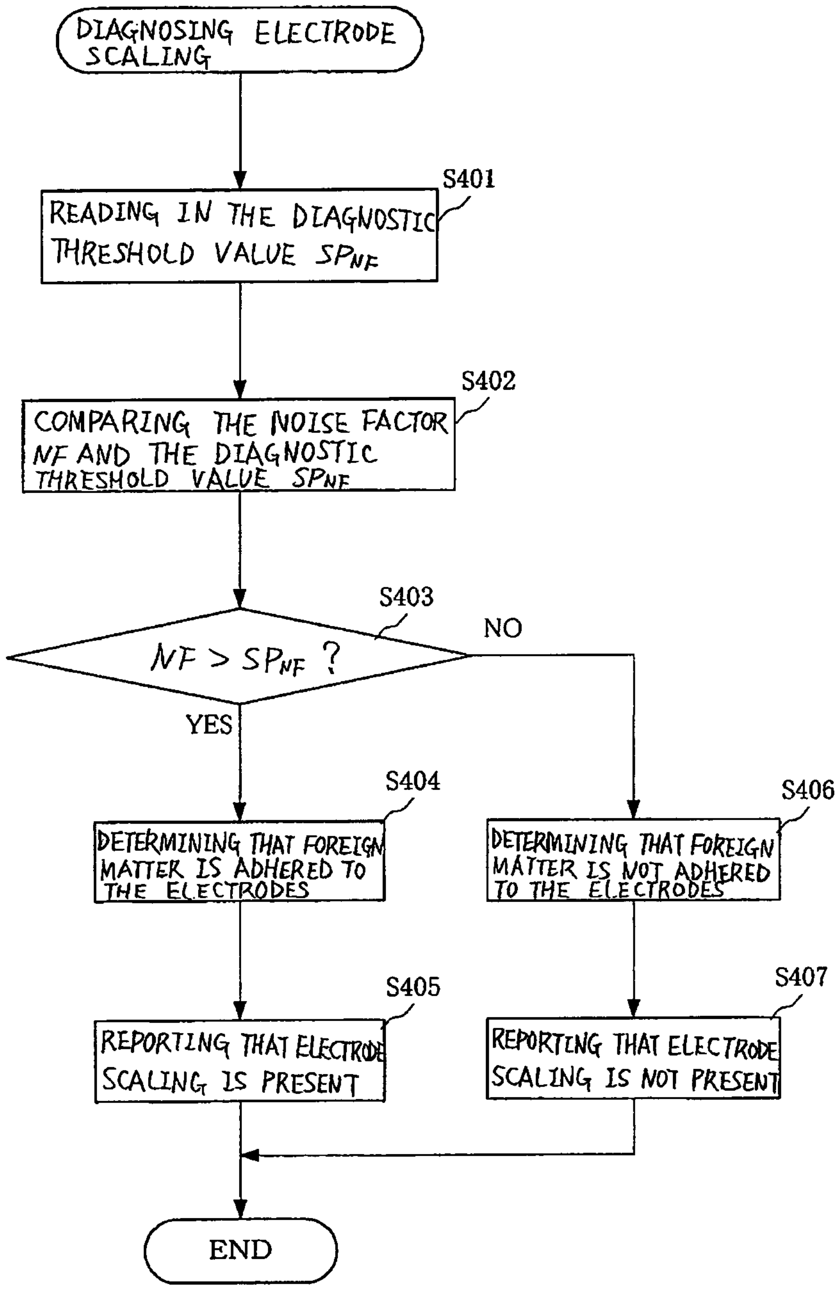
FIG. 5 is a flow chart of an electrode scaling diagnosing routine, which is based on a noise evaluation value, that is performed by the control unit in the electromagnetic flow meter of the working example 1.

FIG. 5 is a flow chart of the electrode scaling diagnosing routine based on the noise evaluation value. When the control unit 28 completes the calculation of the noise factor NF, the control unit 28 reads out the diagnostic threshold value $SP_{NF}$ stored in the diagnostic threshold value storage unit 28F (i.e., a step S401). Furthermore, the calculated noise factor NF and the read-in diagnostic threshold value $SP_{NF}$ are compared (i.e., a step S402).

Here, if the noise factor NF is greater than the diagnostic threshold value $SP_{NF}$ (i.e., YES in a step S403), then the control unit 28 determines that foreign matter is adhered to one or both of the electrodes 13A, 13B (i.e., a step S404) and reports, as the diagnostic result, that electrode scaling is present (i.e., a step S405). If the noise factor NF is less than or equal to the diagnostic threshold value $SP_{NF}$ (i.e., NO in the step S403), then the control unit 28 determines that foreign matter is not adhered to the electrodes 13A, 13B (i.e., a step S406) and reports, as the diagnostic result, that electrode scaling is not present (i.e., a step S407).

Furthermore, the electrode scaling diagnosis based on the noise evaluation value is performed by the electrode scaling diagnosing unit 28G, and the diagnostic result, namely, whether electrode scaling is present, from the electrode scaling diagnosing unit 28G is output from the scaling diagnosis output unit 30.

(About the Diagnostic Threshold Value $SP_{NF}$)

FIG. 6 through FIG. 12 show waveforms of the analog flow signal (i.e., the flow signal component plus the noise component) from the AC amplifier circuit 22 observed on sample meters, wherein multiple electromagnetic flow meters 100, whose states of adherence of foreign matter to the electrodes 13A, 13B (i.e., 'A' electrode, 'B' electrode) are different one to the next, serve as the sample meters.

Figure 6:
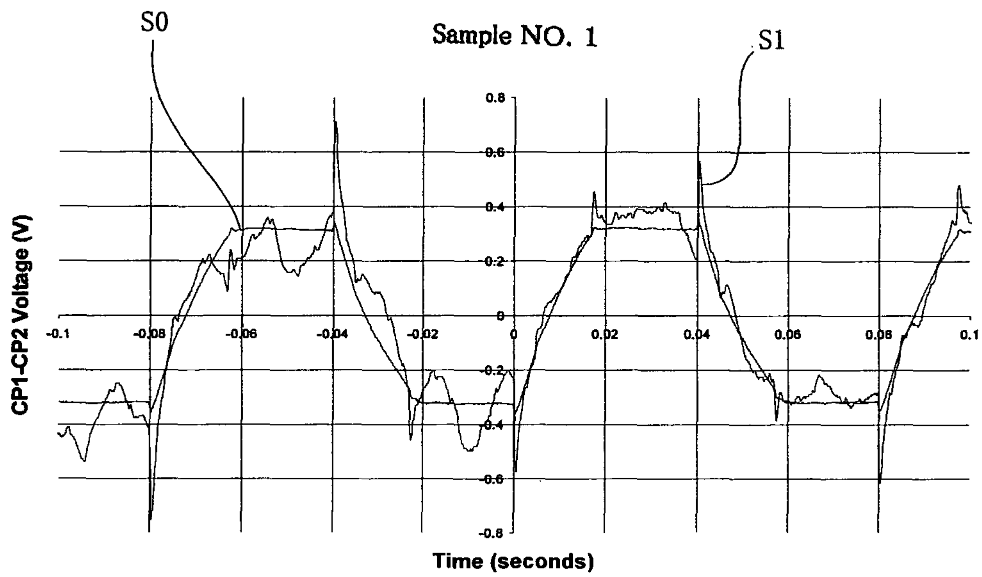
FIG. 6 shows the observed waveform of an analog flow signal (i.e., a flow signal component and noise component) in an electromagnetic flow meter (i.e., a meter of a sample No. 1) in a unique state of adherence of foreign matter to the electrodes.
Figure 7:
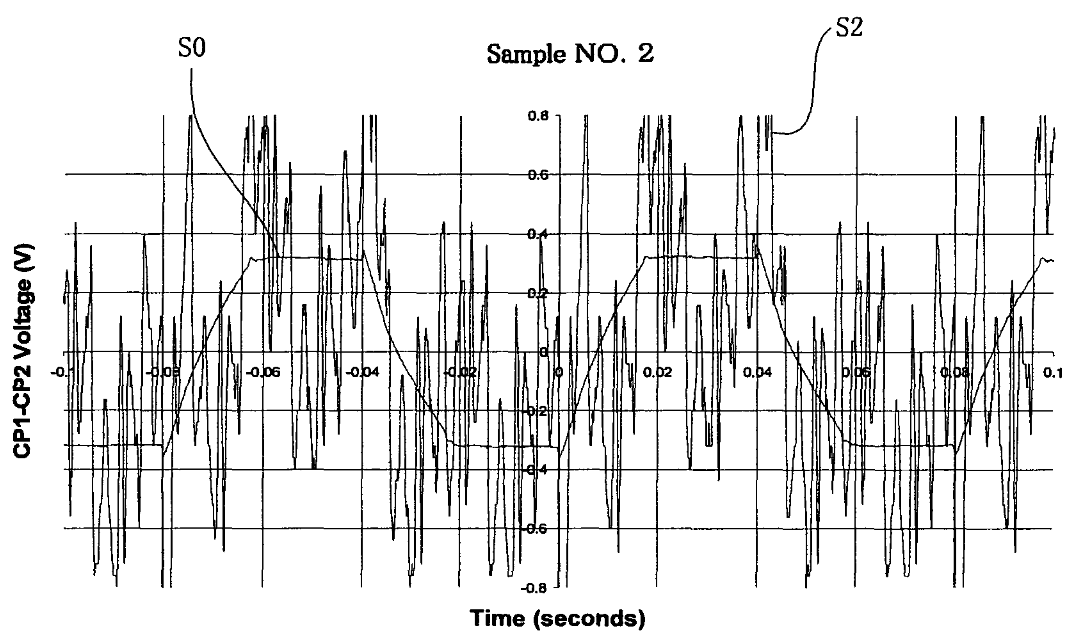
FIG. 7 shows the observed waveform of an analog flow signal (i.e., a flow signal component and noise component) in an electromagnetic flow meter (i.e., a meter of a sample No. 2) in a unique state of adherence of foreign matter to the electrodes.
Figure 8:
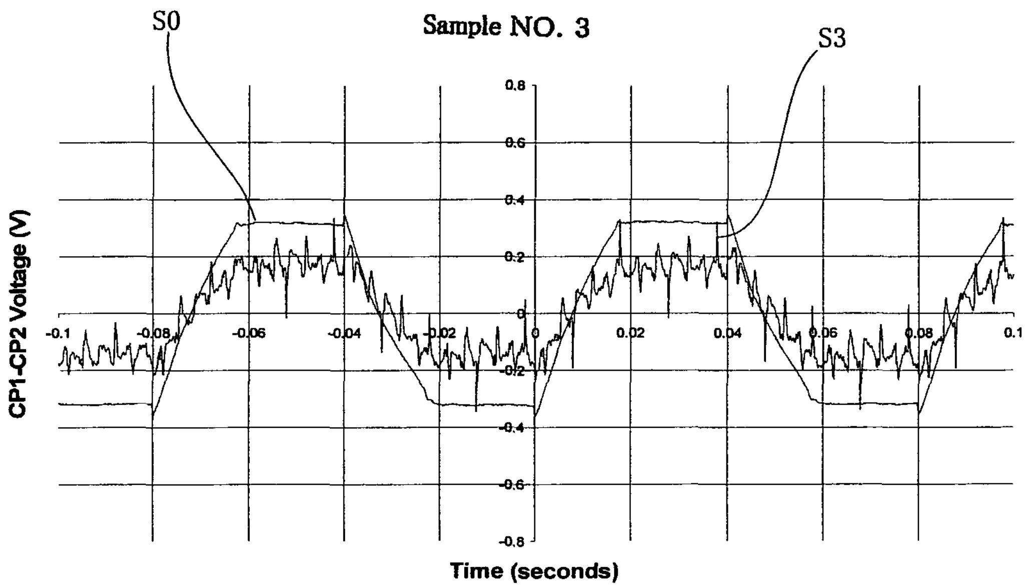
FIG. 8 shows the observed waveform of an analog flow signal (i.e., a flow signal component and noise component) in an electromagnetic flow meter (i.e., a meter of a sample No. 3) in a unique state of adherence of foreign matter to the electrodes.
Figure 9:
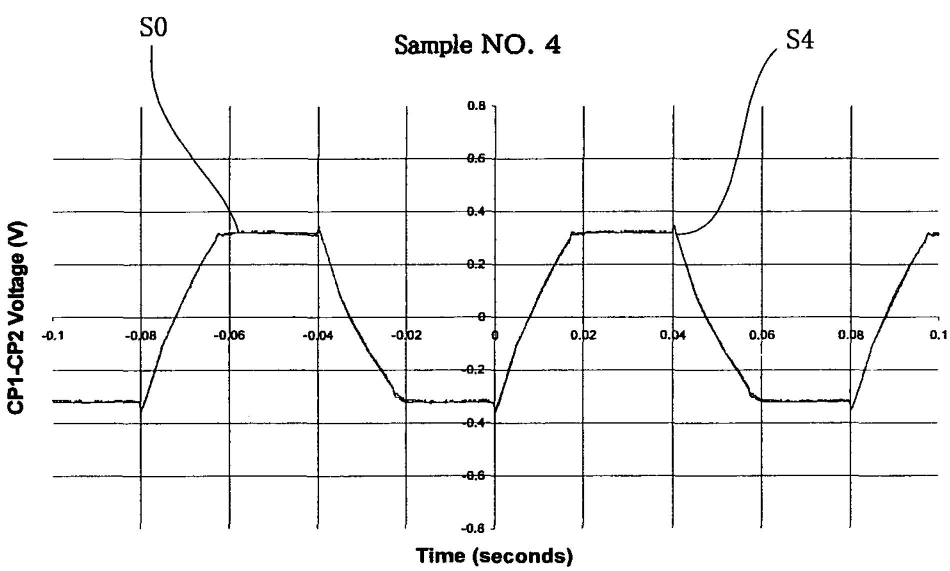
FIG. 9 shows the observed waveform of an analog flow signal (i.e., a flow signal component and noise component) in an electromagnetic flow meter (i.e., a meter of a sample No. 4) in a unique state of adherence of foreign matter to the electrodes.

FIG. 6 graphs the observed waveform on the meter of a sample No. 1 (scaling state (outward appearance): used meter; heavily scaled throughout); FIG. 7 graphs the observed waveform on the meter of a sample No. 2 (scaling state (outward appearance): extremely heavy scale throughout); FIG. 8 graphs the observed waveform on the meter of a sample No. 3 (scaling state (outward appearance): partly scaled; thin hard scale on 'B' electrode; 'A' electrode clean); and FIG. 9 graphs the observed waveform on the meter of a sample No. 4 (scaling state (outward appearance): 'A' electrode scaled; 'B' electrode partially scaled).

Figure 10:
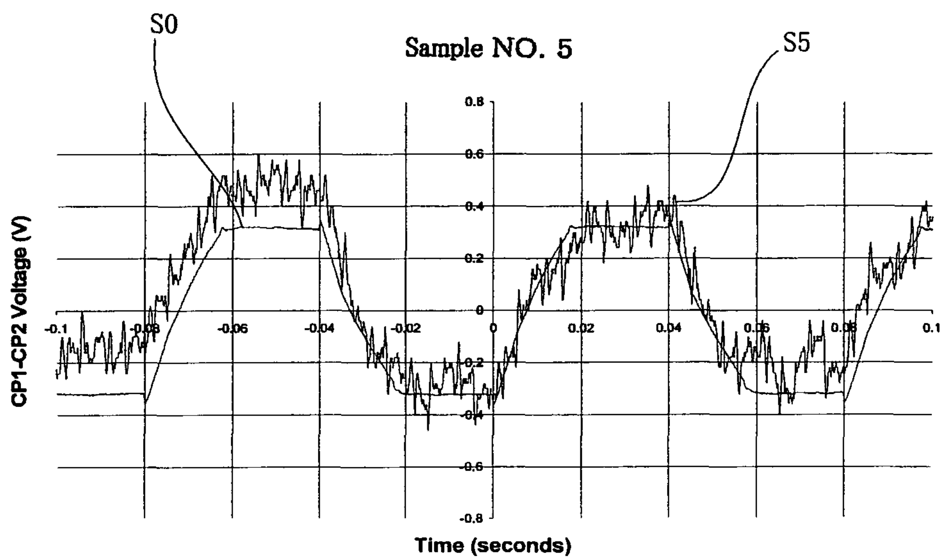
FIG. 10 shows the observed waveform of an analog flow signal (i.e., a flow signal component and noise component) in an electromagnetic flow meter (i.e., a meter of a sample No. 5) in a unique state of adherence of foreign matter to the electrodes.
Figure 11:
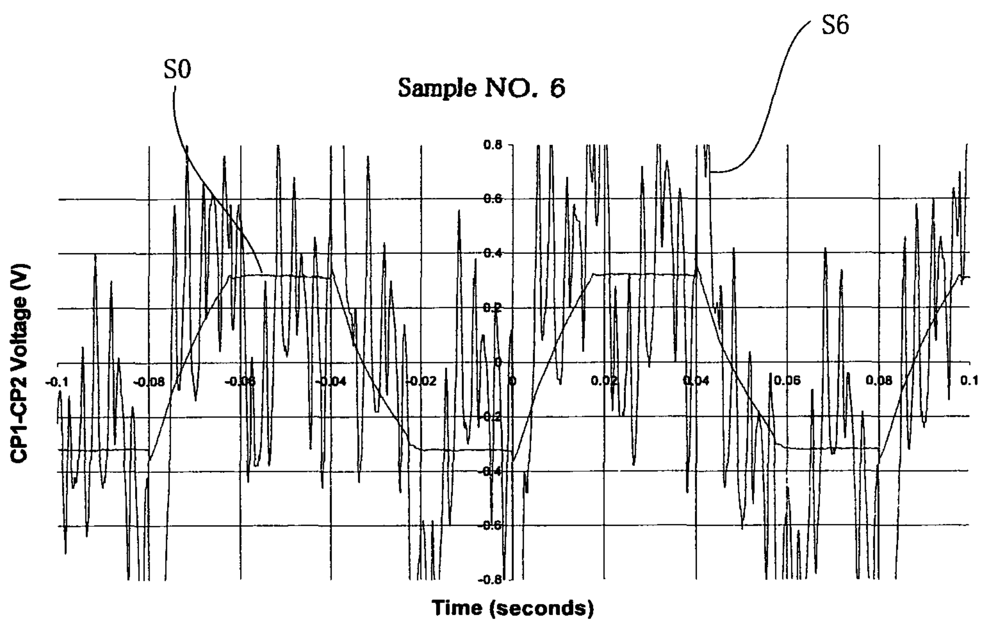
FIG. 11 shows the observed waveform of an analog flow signal (i.e., a flow signal component and noise component) in an electromagnetic flow meter (i.e., a meter of a sample No. 6) in a unique state of adherence of foreign matter to the electrodes.

FIG. 10 graphs an observed waveform on the meter of a sample No. 5 (scaling state (outward appearance): medium to heavy scale on both electrodes); FIG. 11 graphs the observed waveform on the meter of a sample No. 6 (scaling state (outward appearance): heavy scaling throughout; both electrodes fully covered); and FIG. 12 graphs an observed waveform on the meter of a sample No. 7 (scaling state (outward appearance): medium scale throughout; both electrodes covered).

Furthermore, in FIG. 6 through FIG. 12, symbols S1-S7 are the waveforms observed on the meters, and a waveform S0 is the normal waveform when foreign matter is not adhered to the electrodes 'A', 'B' and is shown for the sake of comparison.

Figure 14:
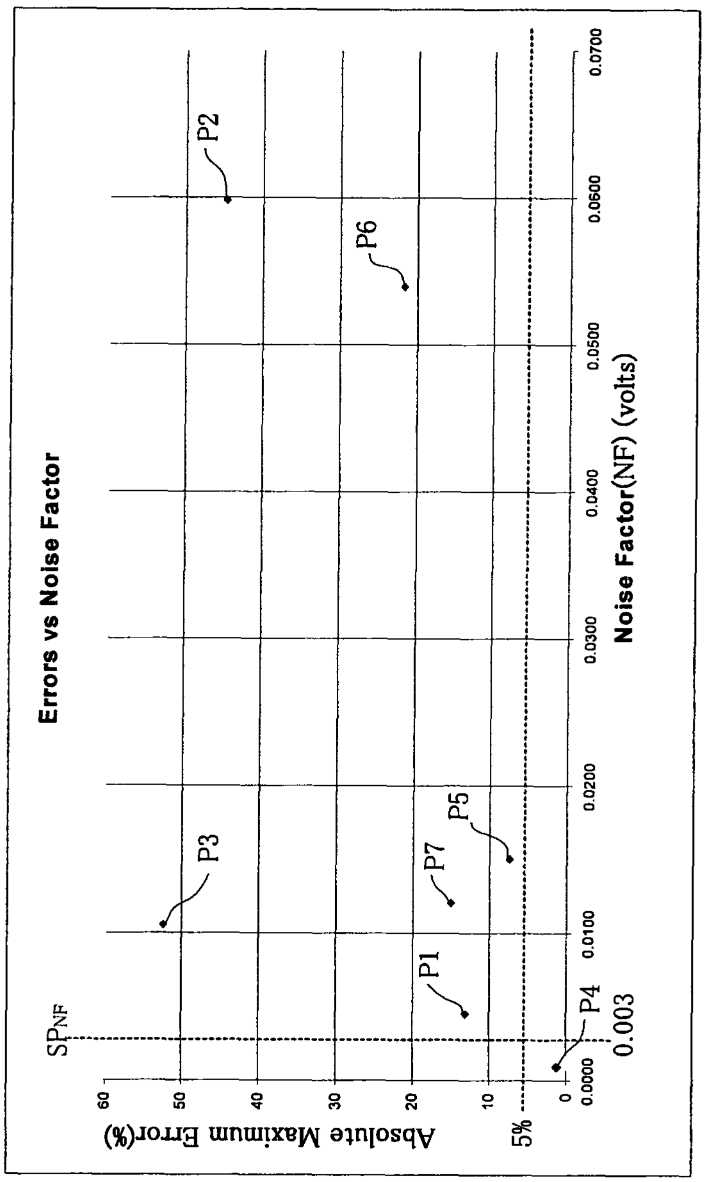
FIG. 14 is a graph that plots the relationship between the noise factor NF and the flow measurement error Error, wherein the noise factor NF is the abscissa and the flow measurement error Error is the ordinate.

FIG. 13 describes the relationship between the noise factor NF (volts), calculated in the meter Nos. 1-7, and a flow measurement error Error (%). FIG. 14 is a graph that plots the relationship between the noise factor NF and the flow measurement error Error, wherein the abscissa represents the noise factor NF and the ordinate represents the flow measurement error Error.

In FIG. 14, a symbol P1 is a plot point of the No. 1 meter, a symbol P2 is a plot point of the No. 2 meter, a symbol P3 is a plot point of the No. 3 meter, a symbol P4 is a plot point of the No. 4meter, a symbol P5 is a plot point of the No. 5 meter, a symbol P6 is a plot point of the No. 6 meter, and a symbol P7 is a plot point of the No. 7 meter.

In FIG. 14, a satisfactory correlation is not found between the noise factor NF and the flow measurement error Error; however, if the diagnostic threshold value $SP_{NF}$ is set to, for example, 0.003 (volts), then it is determined that the meters wherein the flow measurement error is greater than or equal to 5%, namely, the No. 1-No. 3 meters and the No. 5-No. 7 meters, are meters wherein foreign matter is adhered. In so doing, in the working example 1, appropriately setting the diagnostic threshold value $SP_{NF}$ makes it possible to accurately detect whether the adherence of foreign matter to the electrodes, which affects flow measurement accuracy, is present.

Figure 15:
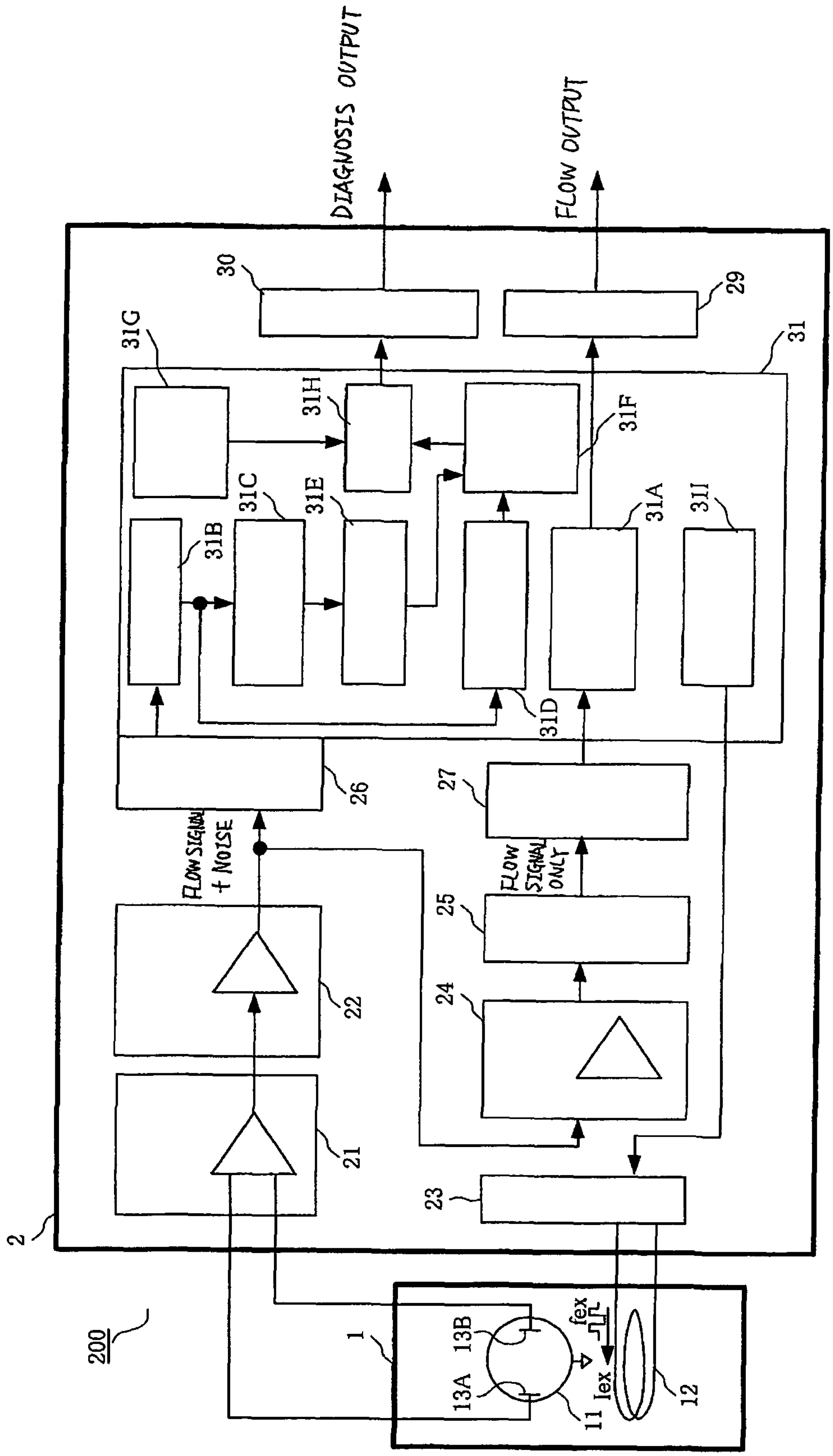
FIG. 15 shows the principal parts of a second working example (i.e., a working example 2) of the electromagnetic flow meter according to the present invention.

Working Example 2: Example of Using a High Frequency Ratio HR as the Noise Evaluation Value FIG. 15 shows the principal parts of a second working example (i.e., a working example 2) of the electromagnetic flow meter according to the present invention. In this figure, symbols identical to those in FIG. 1 indicate constituent elements that are identical or equivalent to those explained referencing FIG. 1, and explanations thereof are therefore omitted. Furthermore, in the working example 2, a symbol 31 indicates the control unit in the converter 2 in order to differentiate it from the control unit 28 in the working example 1. In addition, the entire electromagnetic flow meter is indicated by a symbol 200.

In the working example 2, the control unit 31 comprises a flow calculating unit 31A, which serves as a functional block for implementing the flow calculating function, and comprises a sampling unit 31B, a digital high pass filter 31C, a first integration unit 31D, a second integration unit 31E, a noise evaluation value calculating unit 31F, a diagnostic threshold value storage unit 31G, and an electrode scaling diagnosing unit 31H, which serve as a functional block for implementing the electrode scaling diagnosing function. Furthermore, a symbol 31I is an excitation control unit, which instructs the excitation unit 23 to generate the excitation current Iex. In addition, a predetermined diagnostic threshold value $SP_{HR}$ is stored in the diagnostic threshold value storage unit 31G.

(Flow Calculating Function)

In the control unit 31, the flow calculating unit 31A calculates the present flow of the fluid flowing inside the measurement tube 11 based on the DC flow signal, which was converted to a digital signal by the second A/D conversion unit 27, and outputs the calculated flow via the flow output unit 29.

(Electrode Scaling Diagnosing Function)

In the control unit 31, the electrode scaling diagnosing function comprises a first integrated value calculating function, a second integrated value calculating function, a noise evaluation value calculating function that performs its calculation based on the first integrated value and the second integrated value, and a decision function that performs its diagnosis based on the calculated noise evaluation value.

(Calculating the First Integrated Value)

During the operation of installing the electromagnetic flow meter 200 on-site, the control unit 31 reads in the value of the digital signal from the first A/D conversion unit 26 for the prescribed interval of one period of the excitation frequency fex at the sample timings generated with the prescribed cycle and calculates the first integrated value as the value obtained by integrating the absolute values of all frequency components of the digital signal read in for the prescribed interval. In this case, the sampling unit 31B performs the sampling of the digital signal and the first integration unit 31D performs the calculation of the first integrated value.

Furthermore, in this example, too, the prescribed interval is one period of the excitation frequency fex, but it is not limited thereto; for example, the prescribed interval may be two periods, three periods, or four periods of the excitation frequency fex. In addition, the prescribed interval may be determined arbitrarily with no relation to the excitation frequency fex and may also include a pause interval.

(Calculating the Second Integrated Value)

During the operation of installing the electromagnetic flow meter 200 on-site, the control unit 31 reads in the values of the digital signal from the first A/D conversion unit 26 for the prescribed interval of one period of the excitation frequency fex at the sample timings generated with the prescribed cycle and calculates the second integrated value by integrating the absolute values of frequency components—of the frequency components of the digital signal that were read in during the prescribed interval—greater than or equal to a cutoff frequency fc, which is defined as a prescribed frequency that is higher than the excitation frequency fex (in the present example, eight times higher).

In this case, the sampling unit 31B performs the sampling of the digital signal, the digital high pass filter 31C performs the extraction of the frequency components that are greater than or equal to the cutoff frequency fc, and the second integrating unit 31E performs the calculation of the second integrated value by integrating the absolute values of the extracted frequency components greater than or equal to the cutoff frequency fc. In addition, the calculation of the second integrated value is performed for the prescribed interval, as with the first integrated value, and the calculation of both the first integrated value and the second integrated value is repeated at prescribed intervals.

(Calculation of the Noise Evaluation Value (High Frequency Ratio HR))

At the prescribed intervals, the control unit 31 calculates the noise evaluation value (i.e., the high frequency ratio HR) as the ratio of the calculated second integrated value to the calculated first integrated value. The calculation of the high frequency ratio HR is performed by the noise evaluation value calculating unit 31F.

Figure 16:
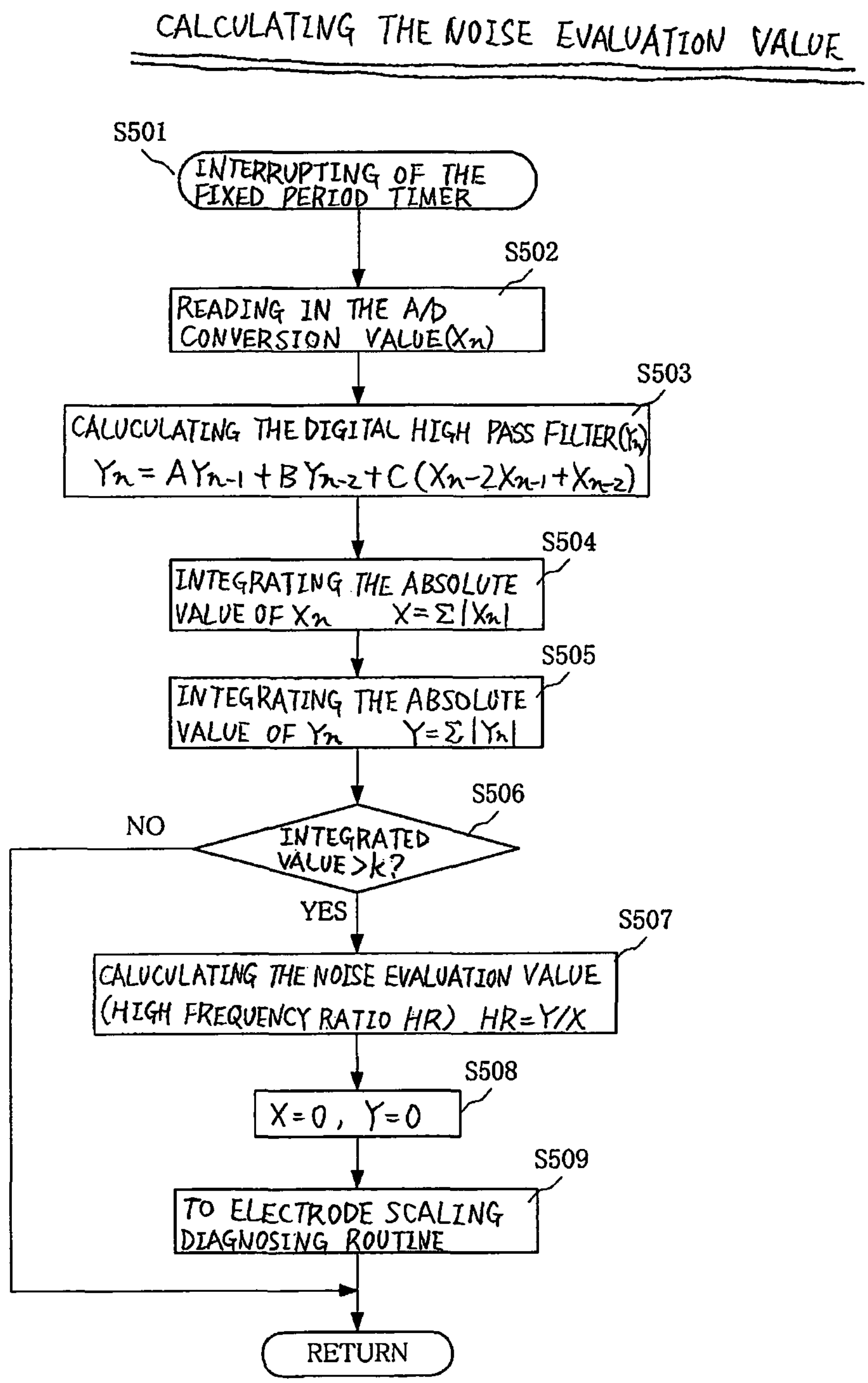
FIG. 16 is a flow chart of a noise evaluation value calculation operation that includes a calculation of a first integrated value and a second integrated value and is performed by the control unit of the electromagnetic flow meter of the working example 2.

FIG. 16 is a flow chart of a noise evaluation value (i.e., high frequency ratio HR) calculation operation that includes the calculation of the first integrated value and the second integrated value.

The control unit 31 starts sampling upon an interrupt of the fixed period timer (i.e., a step S501) and reads in, as $X_n$, the value of the digital signal (i.e., the A/D conversion value) from the first A/D conversion unit 26 at the sample timing n (i.e., a step S502). In addition, based on this digital signal, the digital high pass filter 31C calculates the calculated value $Y_n$ (i.e., a step S503). Furthermore, specifically, the calculated value $Y_n$ is calculated from the expression $Y_n=AY_{n-1}+BY_{n-2}+C(X_n-2X_{n-1}+X_{n-2})$ (wherein A, B, and C are constants). Furthermore, the absolute values of $X_n$ read in are integrated, namely, the integrated value $X=\Sigma|X_n|$ (i.e., a step S504). In addition, the absolute values of the calculated $Y_n$ are integrated, namely, integrated value $Y=\Sigma|Y_n|$ (i.e., a step S505).

The control unit 31 repeats the processing operations in the steps S502-S505 for each period of the excitation frequency fex, which is defined as the prescribed interval; furthermore, when the integration count of the $X_n$ and $Y_n$ reaches the prescribed value k, which indicates the end of the prescribed interval (i.e., YES in a step S506), the value of $X=\Sigma|X_n|$ at that time is assigned as the first integrated value and the value of $Y=\Sigma|Y_n|$ at that time is assigned as the second integrated value. Furthermore, the ratio of the second integrated value Y to the first integrated value X is calculated and assigned as the high frequency ratio HR, namely, HR=Y/X (i.e., a step S507), and the high frequency ratio HR is assigned as the noise evaluation value, which indicates the magnitude of the impact of the noise component owing to the adherence of foreign matter to the electrodes 13A, 13B upon the measurement of the flow. Furthermore, once the high frequency ratio HR is calculated, the X and Y values are cleared (i.e., set to zero) in preparation for the next calculation of the high frequency ratio HR (i.e., a step S508). Furthermore, the method then proceeds to the electrode scaling diagnosing routine (i.e., a step S509), which is based on the calculated noise evaluation value (i.e., the high frequency ratio HR).

(Electrode Scaling Diagnosis Based on the Noise Evaluation Value)

Figure 17:
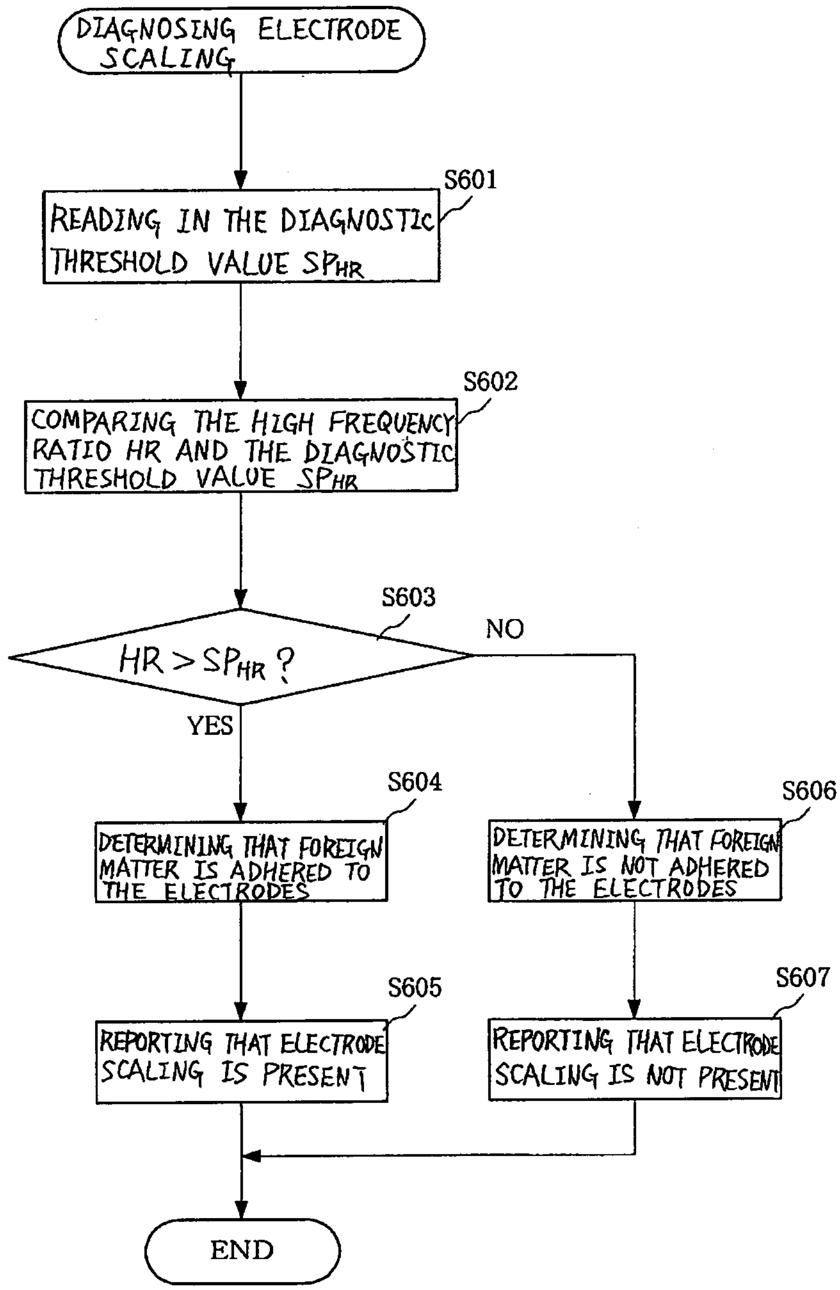
FIG. 17 is a flow chart of an electrode scaling diagnosing routine, which is based on a noise evaluation value, that is performed by the control unit of the electromagnetic flow meter of the working example 2.

FIG. 17 is a flow chart of the electrode scaling diagnosing routine, which is based on the noise evaluation value (i.e., the high frequency ratio HR). When the calculation of the high frequency ratio HR ends, the control unit 31 reads out the diagnostic threshold value $SP_{HR}$, which is stored in the diagnostic threshold value storage unit 31G (i.e., a step S601). Furthermore, the calculated high frequency ratio HR and the read-out diagnostic threshold value $SP_{HR}$ are compared (i.e., a step S602).

Here, if the high frequency ratio HR is greater than the diagnostic threshold value $SP_{HR}$ (i.e., YES in a step S603), then the control unit 31 determines that foreign matter is adhered to one or both of the electrodes 13A, 13B (i.e., a step S604) and reports that electrode scaling is present as the diagnostic result (i.e., a step S605). If the high frequency ratio HR is less than or equal to the diagnostic threshold value $SP_{HR}$ (i.e., NO in the step S603), then the control unit 31 determines that foreign matter is not adhered to the electrodes 13A, 13B (i.e., a step S606) and reports that electrode scaling is absent as the diagnostic result (i.e., a step S607).

Furthermore, the electrode scaling diagnosis based on the noise evaluation value is performed by the electrode scaling diagnosing unit 31H, and the electrode scaling diagnostic result from the electrode scaling diagnosing unit 31H, namely, whether there is electrode scaling, is output from the scaling diagnosis output unit 30.

(About the Diagnostic Threshold Value $SP_{HR}$)

FIG. 18 shows the relationship between the flow measurement error Error (%) and the high frequency ratio HR (%) calculated in the meters of the samples No. 1-No. 7, whose observed waveforms S1-S7 are shown in FIG. 6 through FIG. 12. FIG. 19 plots the relationship between the high frequency ratio HR and the flow measurement error Error, wherein the abscissa represents the high frequency ratio HR and the ordinate represents the flow measurement error Error.

In FIG. 19, P1 is the plot point of the No. 1 meter, P2 is the plot point of the No. 2 meter, P3 is the plot point of the No. 3 meter, P4 is the plot point of the No. 4 meter, P5 is the plot point of the No. 5 meter, P6 is the plot point of the No. 6 meter, and P7 is the plot point of the No. 7 meter.

In FIG. 19, the No. 3 meter, which is plotted at the P3 point, is in the state wherein insulation is adhered to only one of the electrodes, and therefore the high frequency ratio HR is small; however, it is apparent that there is a satisfactory correlation between the high frequency ratio HR and the flow measurement error Error. Namely, there is a satisfactory correlation between: the error percentage difference in the flow of the measured fluid actually flowing through the electromagnetic flow meter and the flow measured by the electromagnetic flow meter; and the ratio of the value calculated by integrating the power of the frequency components in the signal voltage (i.e., both the flow signal component and noise component) obtained from the electrodes that are greater than or equal to the cutoff frequency fc and the value calculated by integrating the power of all frequency components in the signal voltage.

Taking advantage of this relationship, in the working example 2, the question of whether foreign matter is adhered to the electrodes is determined by calculating the high frequency ratio HR and comparing it with the diagnostic threshold value $SP_{HR}$. In FIG. 19, if the diagnostic threshold value $SP_{HR}$ is set to, for example, 10(%), then the meters wherein foreign matter is adhered are determined to be those meters wherein the flow measurement error exceeds 5%, namely, meters No. 1-No. 3 and No. 5-No. 7. Thus, in the working example 2, appropriately setting the diagnostic threshold value $SP_{HR}$ makes it possible to accurately detect whether the adherence of foreign matter to the electrodes, which affects flow measurement accuracy, is present.

In addition, in the working example 2, the normal data group is not needed, as it is in the working example 1, and therefore differences in flow during normal data acquisition, the state of the fluid, and the like have no impact. Namely, in the working example 1, there is a risk of misdiagnosis if, for example, there is a difference between the flow during normal data group acquisition and the flow during diagnosis, or if the fluid state varies (i.e., if there is a disparity in the flow signal itself). In contrast, in the working example 2, the first integrated value X and the second integrated value Y are calculated based on the same flow and the same fluid state, and therefore there is no such risk of misdiagnosis. In addition, in the working example 2, there is no need to coordinate the sampling start timing with the excitation start timing, and therefore the processing in the control unit is simpler.

FIG. 20 shows an embodiment of the excitation frequency fex—here, synchronized with the service power supply frequency 50 Hz AC—the excitation period, the sample size, and the cutoff frequency fc. FIG. 21 shows an embodiment of the excitation frequency fex—here, synchronized with the service power supply frequency 60 Hz AC—the excitation period, the sample size, and the cutoff frequency fc.

In the case of synchronization with the service power supply frequency 50 Hz AC, in the standard type, the excitation frequency fex is set to 12.5 Hz, which is ¼ of the service power supply frequency, and the cutoff frequency fc is set to 100 Hz, which is eight times the excitation frequency fex. In the case of synchronization with the service power supply frequency 60 Hz AC, in the standard type, the excitation frequency fex is set to 15 Hz, which is ¼ of the service power supply frequency, and the cutoff frequency fc is set to 120 Hz, which is eight times the excitation frequency fex.

FIG. 22 shows an embodiment of the excitation frequency fex—here, not synchronized to the AC power supply frequency—the excitation period, the sample size, and the cutoff frequency fc. In the case of not being synchronized to the AC power supply frequency, in the standard type, the excitation frequency fex is set to 12.5 Hz, and the cutoff frequency fc is set to 100 Hz, which is eight times the excitation frequency fex.

Once the cutoff frequency fc has been determined, it is possible to diagnose electrode scaling without being affected by low frequency noise, such as 1/F noise. However, if the cutoff frequency fc is set lower than the service power supply frequency, then it is possible that noise with the same frequency as that of the service power supply frequency may be included. In contrast, if the cutoff frequency fc is set higher than the service power supply frequency, then noise with the same frequency as that of the service power supply frequency cannot be included, which further improves the reliability of electrode scaling diagnosis.

Furthermore, if the digital high pass filter 31C is provided with a function that cuts the same frequency component as that of the service power supply frequency, then only that frequency component that is the same as that of the service power supply frequency is eliminated even if the cutoff frequency fc is not set higher than the service power supply frequency, and thereby the reliability of the electrode scaling diagnosis can be improved. In addition, in the working example 2, the cutoff frequency fc is set to eight times the excitation frequency fex, but the present invention is of course not limited thereto.

Modified Example 1 of the Working Example 2

In the working example 2 discussed above, if the high frequency ratio HR exceeds the diagnostic threshold value $SP_{HR}$ even once, then it is determined that foreign matter is adhered to the electrodes. In contrast, in the modified example 1 of the working example 2, it is determined that electrode scaling is present if the high frequency ratio HR exceeds the diagnostic threshold value $SP_{HR}$ not just once but continuously for a prescribed count.

Figure 23:
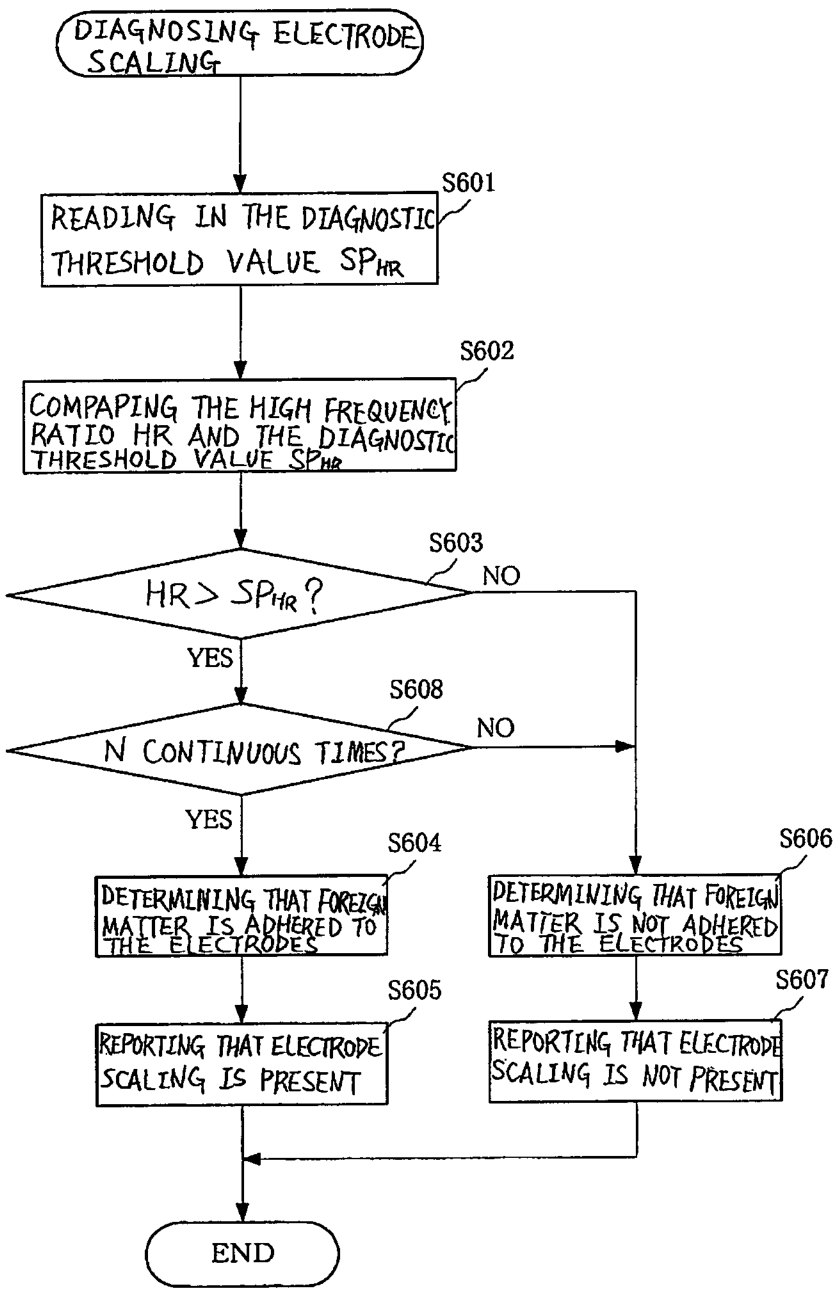
FIG. 23 is a flow chart of an electrode scaling diagnosing routine in a modified example 1 of the working example 2.

FIG. 23 is a flow chart of the electrode scaling diagnosing routine for this case. In this electrode scaling diagnosing routine, as can be understood in comparison with the flow chart of the working example 2 shown in FIG. 17, a step S608 is provided between the step S603 and the step 604, and this step S608 verifies whether the high frequency ratio HR has exceeded the diagnostic threshold value $SP_{HR}$ continuously for N times (e.g., 10 times).

Thereby, if foreign matter continues to adhere to the electrodes and the high frequency ratio HR exceeds the diagnostic threshold value $SP_{HR}$ continuously for N times (i.e., YES in the step S603), then it is first determined that foreign matter is adhered to the electrodes (i.e., the steps S604, S605). Moreover, if foreign matter temporarily adheres to the electrodes and then immediately separates therefrom, it is not determined that electrode scaling is present, which increases the reliability of the determination.

Modified Example 2 of the Working Example 2

Although it is rare for foreign matter adhered to the electrodes continuously for a fixed interval to separate naturally, there are also cases wherein foreign matter separates from the electrodes owing to the fluid or a substance that mixes with the fluid. Given such a case, in the modified example 2 of the working example 2, if it is determined in the modified example 1 of the working example 2 that foreign matter is adhered to the electrodes and the high frequency ratio HR then falls below the diagnostic threshold value $SP_{HR}$ continuously for the prescribed count, then it is determined that electrode scaling is absent.

Figure 24:
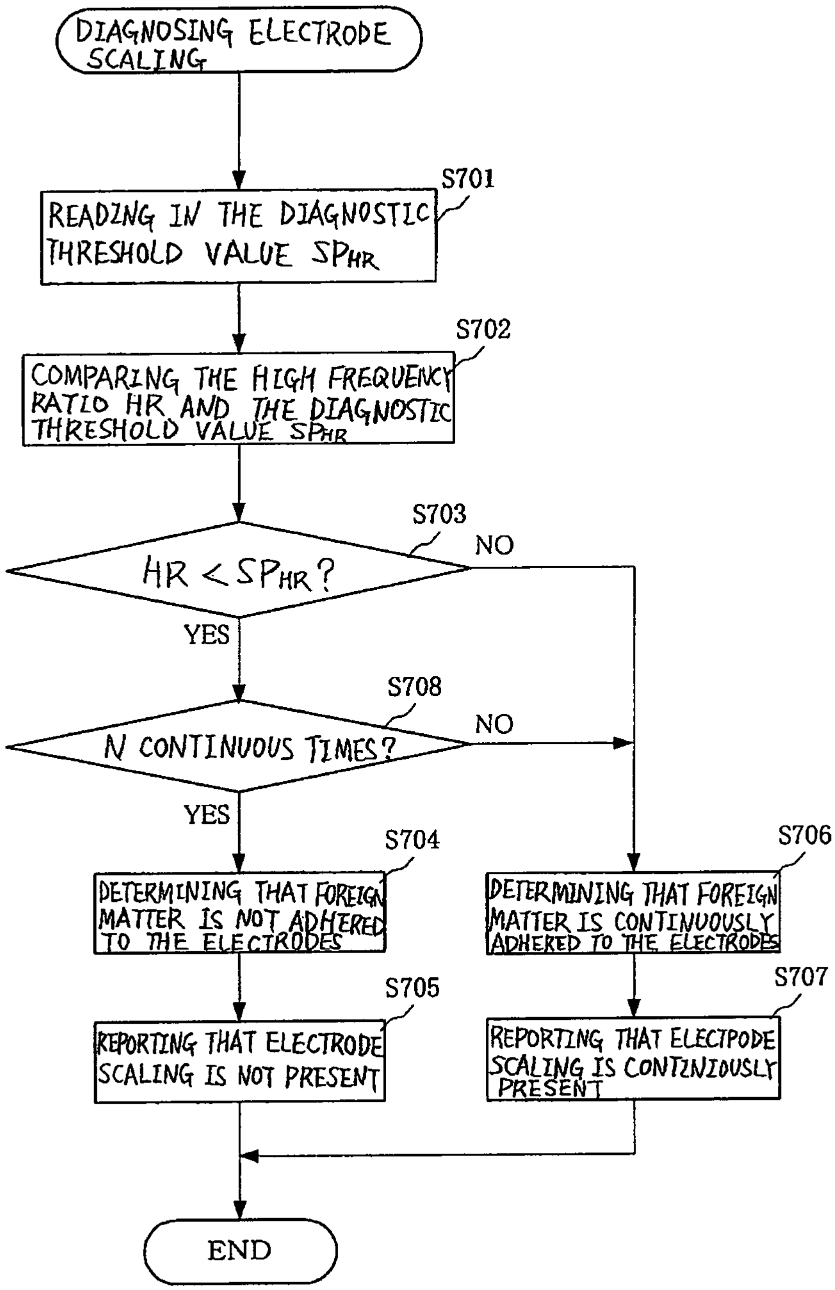
FIG. 24 is a flow chart of an electrode scaling diagnosing routine in a modified example 2 of the working example 2.
Figure 25:
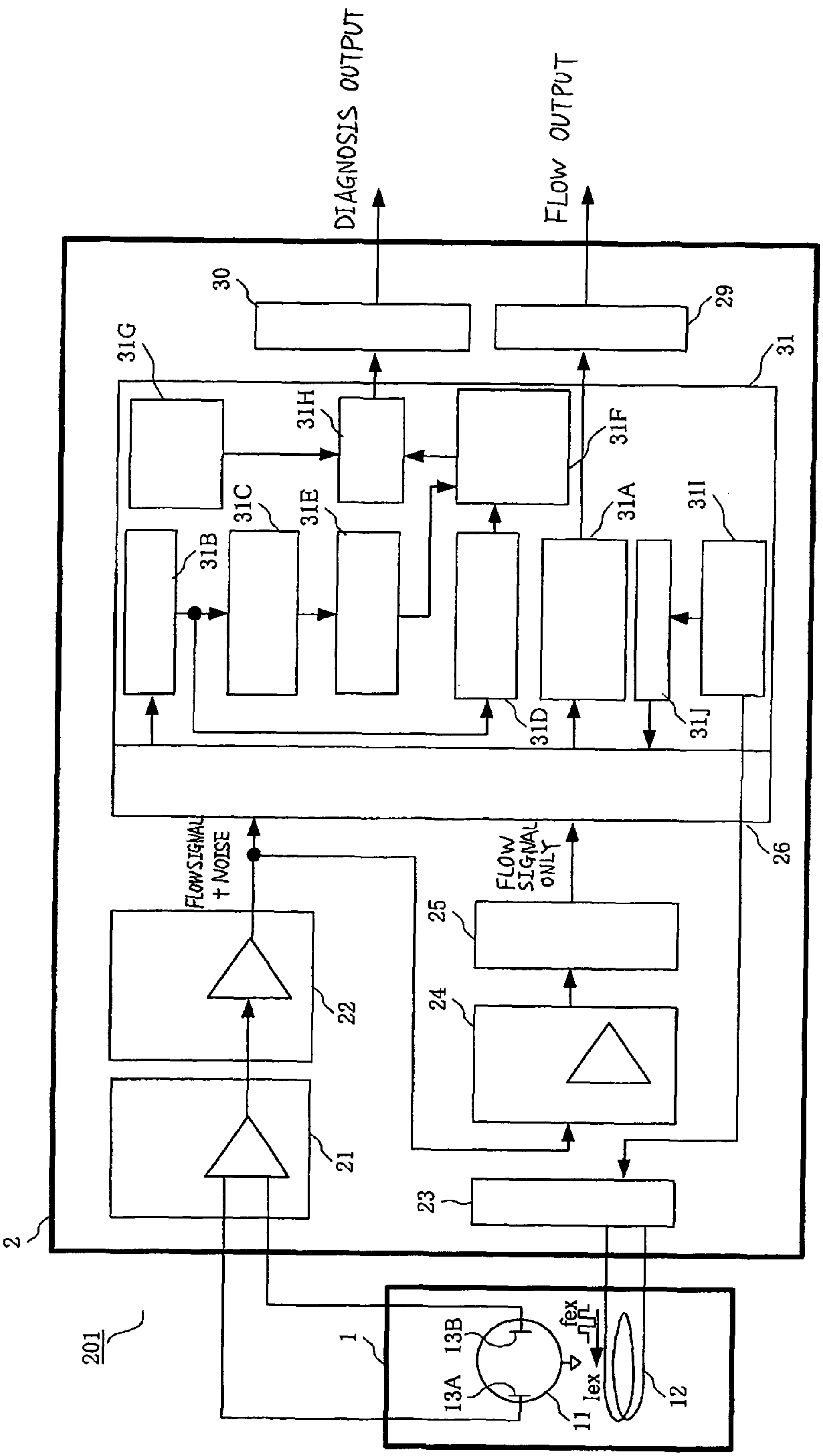
FIG. 25 shows the principle parts of the electromagnetic flow meter in a modified example 3 of the working example 2.

FIG. 24 is a flow chart of the electrode scaling diagnosing routine for such a case. In this case, after the high frequency ratio HR exceeds $SP_{HR}$ continuously for N times and it is determined that electrode scaling is present, the calculation of the high frequency ratio HR continues and a comparison is made between that calculated high frequency ratio HR and the diagnostic threshold value $SP_{HR}$ (i.e., steps S701-S703).

Furthermore, when it is verified that the high frequency ratio HR has fallen below the diagnostic threshold value $SP_{HR}$ continuously for N times (e.g., 10 times) (i.e., YES in a step S708), it is determined that foreign matter is no longer adhered to the electrodes (i.e., steps S704, S705). Until it is determined that foreign matter is no longer adhered to the electrodes, the method proceeds to steps S706, S707 in accordance with NO in the step S703 or NO in the step S708, and it is determined that foreign matter is continuously adhered to the electrodes.

Thereby, if it has been determined that foreign matter is adhered to the electrodes and then it is verified that the resolution of the adherence of foreign matter to the electrodes has continued, at that point it is determined that foreign matter is not adhered to the electrodes, which constitutes a more reliable determination.

Modified Example 3 of the Working Example 2

In the working example 2, the first A/D conversion unit 26 performs A/D conversion on the signal that contains noise, and therefore the conversion accuracy does not have to be all that high; however, it is preferable that the conversion speed of the A/D converter is high. Consequently, the A/D converter built into the CPU in the control unit 28 is used. Moreover, because the second A/D conversion unit 27 handles the flow signal, an A/D converter with a high conversion accuracy is preferable even if the sampling period is relatively long. Consequently, an A/D converter that converts the analog signal to the digital signal with a conversion accuracy higher than that of the first A/D conversion unit 26 is used as the second A/D conversion unit 27. Thereby, an electromagnetic flow meter with both a high flow calculation accuracy and a high electrode scaling diagnosis reliability is obtained.

In contrast, in the modified example 3 of the working example 2, the analog flow signal from the AC amplifier circuit 22 and the DC flow signal from the noise cancelling circuit 25 are supplied to the first A/D conversion unit 26; furthermore, upon a command from a time dividing unit 31J, which is provided to the control unit 31, the first A/D conversion unit 26 converts, on a time division basis, the analog flow signal from the AC amplifier circuit 22 and the DC flow signal from the noise cancelling circuit 25 to digital signals.

In so doing, the first A/D conversion unit 26 performs, on a time division basis, the A/D conversion for electrode scaling diagnosis and the A/D conversion for calculating the flow, which makes the second A/D conversion unit 27 (refer to FIG. 15) unnecessary and makes it possible to reduce costs. A symbol 201 indicates an electromagnetic flow meter according to the modified example 3 of the working example 2. Furthermore, in the electromagnetic flow meter 201, the first A/D conversion unit 26 handles the flow signal, and therefore preferably has high conversion accuracy. In this case, the A/D converter built into the CPU in the control unit 31 may be used for high conversion accuracy, or an A/D converter with a high conversion accuracy may be provided separately from the control unit 31 as the first A/D conversion unit 26.

Furthermore, in the working example 1 discussed above, as in the modified example 1 of the working example 2, electrode scaling may be determined as present when the noise factor NF exceeds the diagnostic threshold value $SP_{NF}$ continuously for the prescribed count. In addition, as in the modified example 2 of the working example 2, electrode scaling may be determined as absent when, after it has been determined that electrode scaling is present, the noise factor NF falls below the diagnostic threshold value $SP_{NF}$ continuously for the prescribed count. In addition, as in the modified example 3 of the working example 2, the A/D conversion in the first A/D conversion unit 26 may be performed on a time division basis.

In addition, in the working example 1 and the working example 2 discussed above, the diagnostic threshold values SP (i.e., $SP_{NF}$, $SP_{HR}$) may be used to diagnose the adherence of foreign matter to the electrodes in stages; for example, in the case of two stages, a minor warning may be reported in a first stage and a critical warning may be reported in a second stage.

INDUSTRIAL FIELD OF APPLICATION

The electromagnetic flow meter of the present invention can be used in various process systems to measure the flow of an electrically conductive fluid.

The invention claimed is:

1. An electromagnetic flow meter, comprising:
- a measurement tube comprising a flowing fluid;
- an excitation coil;
- an excitation current supply supplying an excitation current with an excitation frequency fex to the excitation coil;
- a pair of electrodes disposed inside the measurement tube;
- a flow meter based on an emf that arises between the electrodes;
- a first A/D converter converting the emf to a digital signal;
- a sampler sampling the digital signal within a prescribed period;
- a first integrating calculator calculating as a first integrated value a value calculated by integrating the absolute values of all frequency components of the sample data sampled by the sampler for a prescribed interval;
- a high frequency components filter extracting frequency components of the frequency components of the sample data sampled by the sampler for the prescribed interval that are greater than or equal to a prescribed frequency, which is higher than the excitation frequency fex;
- a second integrating calculator calculating as a second integrated value a value calculated by integrating the absolute values of the extracted frequency components that are greater than or equal to the prescribed frequency;
- a noise evaluation value calculator calculating, based on at least the sample data sampled by the sampler, as a noise evaluation value, the magnitude of the impact of a noise component owing to adherence of foreign matter to the electrodes upon the measurement of the flow, and calculating as a high frequency ratio (HR) the ratio of the second integrated value, which is calculated by the second integrating calculator, to the first integrated value, which is calculated by the first integrating calculator;
- an electrode scaling diagnostic determining an electrode foreign matter adherence state by comparing the noise evaluation value and a predetermined diagnostic threshold value; and
- a scaling diagnosis output outputting the determined electrode foreign matter adherence state.

2. The electromagnetic flow meter according to claim 1, wherein
- the high frequency components filter does not include in the frequency components to be extracted the frequency component that is the same as a service power supply frequency.

3. The electromagnetic flow meter according to claim 1, wherein
- the electrode scaling diagnostic determines that foreign matter is adhered to the electrodes if the high frequency ratio (HR), which was calculated as the noise evaluation value, exceeds the diagnostic threshold value ($SP_{HR}$) continuously for a prescribed count.

4. The electromagnetic flow meter according to claim 3, wherein
- the electrode scaling diagnostic determines that foreign matter is not adhered to the electrodes if, after it has been determined that foreign matter is adhered to the electrodes, the high frequency ratio (HR), which was calculated as the noise evaluation value, falls below the diagnostic threshold value ($SP_{HR}$) continuously for the prescribed count.

5. The electromagnetic flow meter according to claim 1, further comprising:
- a DC flow signal converter converting the emf to a DC flow signal;
- a noise cancelling filter cancelling a noise component contained in the DC flow signal;
- a second A/D converter converting the DC flow signal, wherein the noise component has been cancelled, to a digital signal; and
- a flow calculator calculating the flow of the fluid based on the DC flow signal, which was converted to the digital signal;
- wherein,
- the second A/D converter comprises an analog to digital signal conversion accuracy that is higher than that of the first A/D converter.

6. The electromagnetic flow meter according to claim 1, further comprising:
- a DC flow signal converter, which converts the emf to a DC flow signal; and
- a noise cancelling filter cancelling a noise component contained in the DC flow signal;
- wherein the first A/D converter also converts, on a time division basis, the emf that contains the noise component and the DC flow signal, wherein the noise component has been eliminated, to digital signals; and comprising
- a flow calculator calculating the flow of the fluid based on the DC flow signal, which was converted to the digital signal.

7. An electromagnetic flow meter, comprising:
- a measurement tube comprising a flowing fluid;
- an excitation coil;
- an excitation current supply supplying an excitation current with an excitation frequency fex to the excitation coil;
- a pair of electrodes disposed inside the measurement tube;
- a flow meter based on an emf that arises between the electrodes;
- a first A/D converter converting the emf to a digital signal;
- a sampler sampling the digital signal within a prescribed period;
- a first integrating calculator calculating as a first integrated value a value calculated by integrating the absolute values of all frequency components of the sample data sampled by the sampler for a prescribed interval;

a high frequency components filter extracting frequency components of the frequency components of the sample data sampled by the sampler for the prescribed interval that are greater than or equal to a prescribed frequency, which is higher than the excitation frequency fex;

a second integrating calculator calculating as a second integrated value a value calculated by integrating the absolute values of the extracted frequency components that are greater than or equal to the prescribed frequency;

a noise evaluation value calculator calculating, based on at least the sample data sampled by the sampler, as a noise evaluation value, the magnitude of the impact of a noise component owing to adherence of foreign matter to the electrodes upon the measurement of the flow, and calculating as a high frequency ratio (HR) the ratio of the second integrated value, which is calculated by the second integrating calculator, to the first integrated value, which is calculated by the first integrating calculator;

an electrode scaling diagnostic determining an electrode foreign matter adherence state by comparing the noise evaluation value and a predetermined diagnostic threshold value using the high frequency ratio (HR) as the noise evaluation value; and a scaling diagnosis output outputting the determined electrode foreign matter adherence state.

8. The electromagnetic flow meter according to claim 7, wherein the high frequency components filter does not include in the frequency components to be extracted the frequency component that is the same as a service power supply frequency.

9. The electromagnetic flow meter according to claim 7, wherein the electrode scaling diagnosing unit determines that foreign matter is adhered to the electrodes if the high frequency ratio (HR), which was calculated as the noise evaluation value, exceeds the diagnostic threshold value ($SP_{HR}$) continuously for a prescribed count.

10. The electromagnetic flow meter according to claim 9, wherein the electrode scaling diagnostic determines that foreign matter is not adhered to the electrodes if, after it has been determined that foreign matter is adhered to the electrodes, the high frequency ratio (HR), which was calculated as the noise evaluation value, falls below the diagnostic threshold value ($SP_{HR}$) continuously for the prescribed count.

11. The electromagnetic flow meter according to claim 7, comprising:

a DC flow signal converter converting the emf to a DC flow signal;

a noise cancelling filter cancelling a noise component contained in the DC flow signal;

a second A/D converter converting the DC flow signal, wherein the noise component has been cancelled, to a digital signal; and a flow calculator calculating the flow of the fluid based on the DC flow signal, which was converted to the digital signal;

wherein, the second A/D converter has an analog to digital signal conversion accuracy that is higher than that of the first A/D converter.

12. The electromagnetic flow meter according to claim 7, comprising:

a DC flow converter converting the emf to a DC flow signal;

a noise cancelling filter cancelling a noise component contained in the DC flow signal;

wherein the first A/D converter converts, on a time division basis, the emf that contains the noise component and the DC flow signal, wherein the noise component has been eliminated, to digital signals; and a flow calculator calculating the flow of the fluid based on the DC flow signal, which was converted to the digital signal.

* * * * *